United States Patent
Aono et al.

(10) Patent No.: US 6,813,314 B2
(45) Date of Patent: Nov. 2, 2004

(54) IMAGE DECODING DEVICE FOR DECODING A HIERARCHICALLY CODED IMAGE

(75) Inventors: Tomoko Aono, Chiba (JP); Hisashi Saiga, Tenri (JP); Hiroyuki Katata, Chiba (JP); Hiroshi Kusao, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/875,098

(22) Filed: Jun. 7, 2001

(65) Prior Publication Data

US 2002/0009142 A1 Jan. 24, 2002

Related U.S. Application Data

(63) Continuation of application No. 09/381,029, filed as application No. PCT/JP98/02349 on May 28, 1998, now Pat. No. 6,259,735.

(30) Foreign Application Priority Data

May 29, 1997 (JP) .............................................. 9-139591
May 11, 1998 (JP) ........................................... 10-126938

(51) Int. Cl.$^7$ ............................................... H04N 7/12
(52) U.S. Cl. .............................. 375/240.11; 375/240.25
(58) Field of Search ....................... 375/240.11, 240.25; H04N 7/12

(56) References Cited

U.S. PATENT DOCUMENTS

| 4,827,336 A | 5/1989 | Acampora et al. |
| 5,260,781 A | 11/1993 | Soloff et al. |
| 5,455,578 A | 10/1995 | Bhandari |

FOREIGN PATENT DOCUMENTS

| EP | 0570818 | 11/1993 |
| JP | 08242379 | 9/1996 |

*Primary Examiner*—Young Lee
(74) *Attorney, Agent, or Firm*—Birch, Stewart, Kolasch & Birch, LLP

(57) ABSTRACT

A video coding device capable of adaptively processing input video data according to property of the data and realizing effective progressive transmission of the coded data even if image components are different in size and/or different in the number of subbands. The above-mentioned object can be realized by the provision of a transferring-order deciding and ranging portion that can prepare an integrated component unit by forming combinations of subband-based frequency-coefficients of respective components Y, U and V and can change the number of respective elements of respective components Y, U and V.

3 Claims, 20 Drawing Sheets

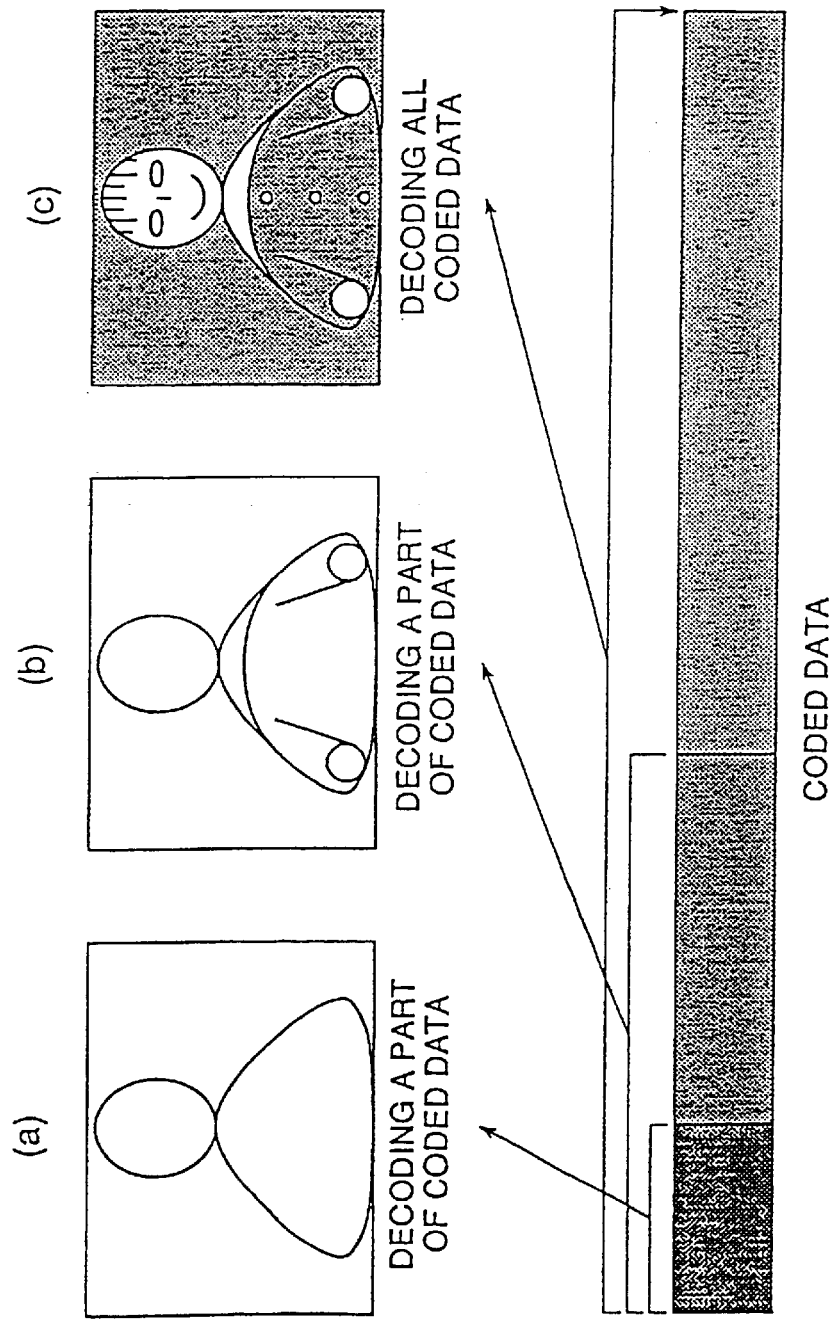

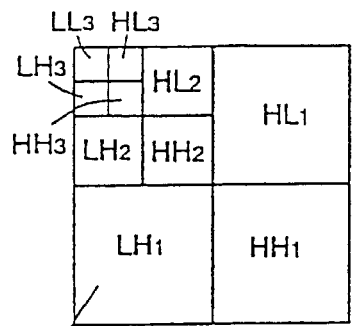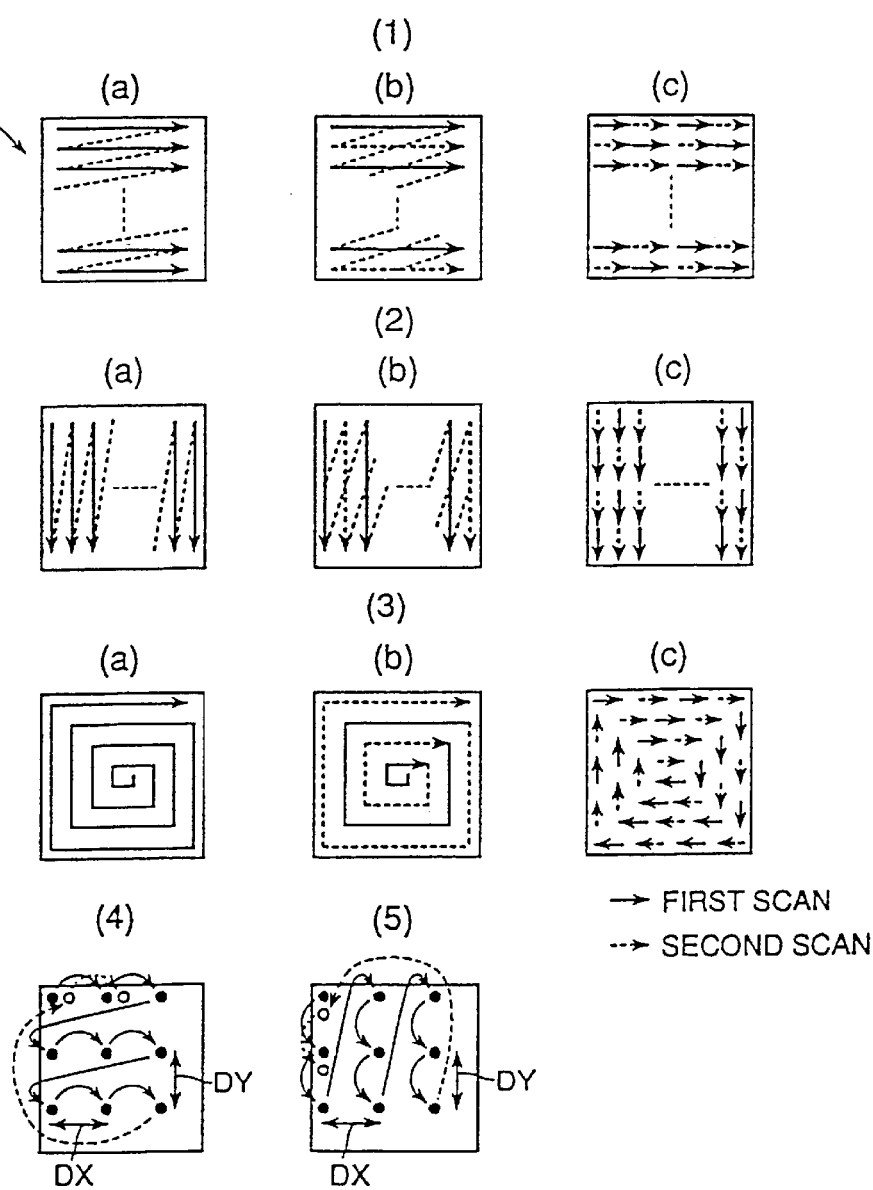
FIG.12

FIG.13
(a)
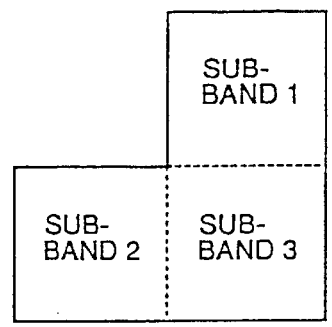
(b)
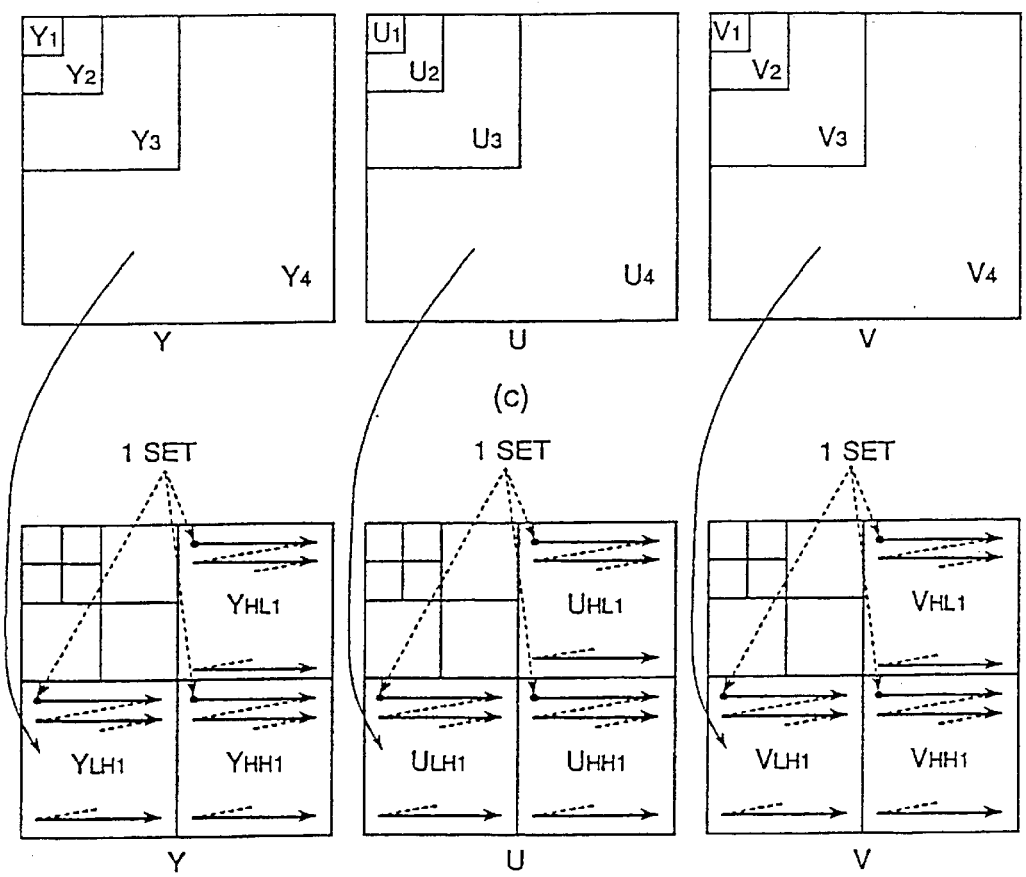
(c)

FIG.21
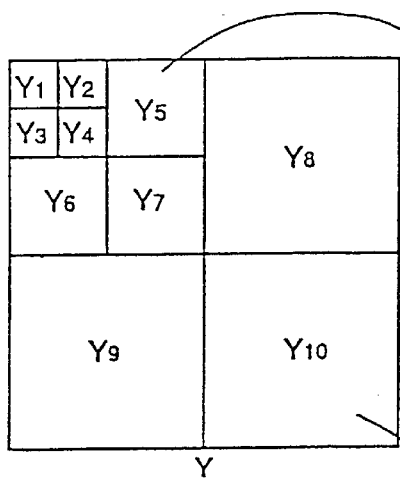
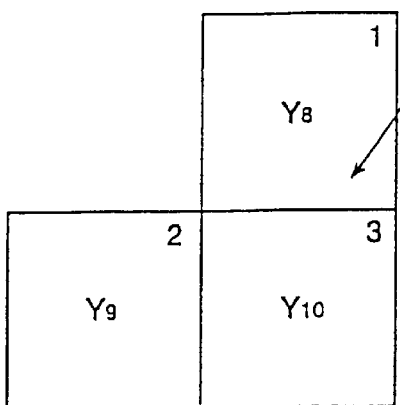

FIG.22

IMAGE DECODING DEVICE FOR DECODING A HIERARCHICALLY CODED IMAGE

This application is a continuation of Ser. No. 09/381,029 filed Sep. 15, 1999, now U.S. Pat. No. 6,259,735 which is a 371 of PCT/JP98/02349 filed May 28, 1998.

BACKGROUND OF THE INVENTION

1. Field of the Invention

The present invention pertains to the field of digital video processing and relates to a video coding device for efficiently encoding video data and a video decoding device for decoding video data coded by the video coding device.

2. Description of Related Art

Recently, there has been proposed a subband coding method that can efficiently encode and decode video signals. The well-known high-efficient subband encoding method is used to decompose an input image into frequency bands by a bank of band-decomposing filters. The band-decomposing filter-bank is a one-dimensional filter-bank that can serve as a two-dimensional band-decomposing filter-bank by repeating processing the input image in horizontal and vertical directions. This method was reported by Fujii, Noumura. "Topics on Wavelet Transform" in a Report of "TECHNICAL REPORT of IEICE, IE92–11, 1992".

In the prior art, a subband image as shown in FIG. 1B obtained by conducting two-dimensional subband decomposition three times. The first two-dimensional subband decomposition obtains a horizontal high-pass and a vertical low-pass band, a horizontal low-pass and vertical high-pass band and a horizontal and vertical high-pass band, which are designated by HL1, LH1 and HH1 respectively. A horizontal and vertical low-pass band obtained by the first decomposition is further subjected to two-dimensional band-decomposition by which three subbands HL2, LH2 and HH2 are obtained.

A horizontal and vertical low-pass subband obtained by the second decomposition is further subjected to third two-dimensional subband decomposition by which three subbands HL3, LH3 and HH3 and a horizontal and vertical low-pass subband LL3 are obtained. A Wavelet-converting filter-bank or a band-decomposing and synthesizing filter-bank may be used as the band-decomposing filter-bank. Thus, the decomposed subband-images are of a hierarchical (layer) structure from low-frequency band to high-frequency band.

Progressive image transmitting can be easily realized utilizing the hierarchical structure of the subband images. The progressive image transmitting method enables a video decoding device to reproduce a low-resolution image by using only a part of coded data. The more coded data is reproduced, the higher resolution the decoded image has. Japanese Laid-Open Patent Publication (TOKKAI HEI) No. 8-242379 describes a system (referred hereinafter to as a prior art system) to realize the progressive image transmitting.

A video coding device using the prior art system includes a subband decomposing portion for decomposing an input image into subband images by using two-dimensional decomposing filters, a coefficient coding portion for encoding coefficients of the decomposed subband images, a variable-length coding portion for performing variable-length coding of the coded coefficient data from the coefficient coding portion and a line-transmitting portion for transmitting a plurality of components composing the image per line at a time. The coefficient coding portion performs encoding the coefficients by using any one of various kinds of coding methods (e.g., DPCM coding, zero-tree coding, and scalar-quantizing coding). This process includes a quantizing step.

The operation of the line transmitting portion will be described below in detail, by way of example, with an input image composed of three-components Y (a luminance component) and U, V (chrominance components) and being conducted subband decomposition three times as shown in FIG. 1B. Processing starts from a subband LL3, which gives the lowest resolution of the image.

In the example, the line-transmitting portion transmits the components Y, U and V sequentially line by line in the order from the first line of the subband LL3. Having transferred all lines of the subband LL3, the portion transfers the components Y, U and V in the subbands LH3, HL3 and HH3 respectively in the order: the component Y on the first lines of the subbands LH3, HL3 and HH3; the component U on the first lines of the subbands LH3, HL3 and HH3; the component V on the first lines of the subbands LH3, HL3 and HH3; the component Y on the second lines of the subbands LH3, HL3 and HH3; U on the second lines of LH3, HL3 and HH3; V on the second lines of the subbands LH3, HL3 and HH3 and so on. Having transmitted all lines of LH3, HL3 and HH3, the line transmitting portion transfers, in similar way, lines of LH2, HL2; HH2 and, then, lines of LH1, HL1, HH1. The above-mentioned procedure of the line-transmitting portion is executed according to a programed flow.

Orderly transmission of the components Y, U, V composing the image per line produces coded data having a hierarchical structure.

The prior art video decoding device includes a line receiving portion for receiving the coded data from the line-transmitting portion of the video-coding device above-mentioned and rearranging the data to respective component groups, a variable-length decoding portion for decoding the rearranged variable-length-coded data, a decoded data counting portion for counting bits of data decoded by the variable-length decoding portion, a decoding truncating portion for comparing the number of the bits counted by the decoded-data counting portion with a preset threshold or an externally-given threshold to give a command for stopping the decoding operation of the variable-length decoding portion when the number of decoded bits exceeds the threshold, a data completing portion for compensating for lack of truncated data by adding zero when having truncated the decoding the coded data at the specified number of bits, a coefficient decoding portion for decoding coded coefficient data by reversing the same processing procedure of the coefficient coding portion and a subband synthesizing portion for synthesizing an image from the subbands through two-dimensional synthesizing filters.

The video decoding device can thus reproduce an entire image from coded data having a hierarchical structure or a part thereof.

The conventional video-coding and video-decoding system can realize progressive image transmitting by transmitting image components per line in an ascending order starting from the lowest-resolution band-image. However, the prior art system encounters several inconvenient problems resulting from the fixed transfer-unit of a line. For example, an image composed of luminance component Y and chrominance components U and V may be easier recognized by transmitting only the component Y before the components U and V rather than transmitting all components as a unit.

In this case, it is preferable to transfer the image components subband by subband, not by line. Furthermore, it is proved that an image composed of components R, G, B may be reproduced with better subjective image-quality at the decoding terminal when coded coefficients of the respective components R, G and B are transmitted one by one. This is because these components have substantially the same influence on the visual property.

The prior art system presumes that components of an image have the same size. Therefore, it cannot be adaptable to an input image composed of different sizes of components in format of, e.g., 4:2:2 or 4:2:0.

Furthermore, the prior art system presumes that respective components of an image have the same number of subbands and cannot be adaptable to an input image whose components are divided into different numbers of subbands.

SUMMARY OF THE INVENTION

The present invention is directed to a system for effective progressive image transmitting by solving the foregoing problems involved in the prior arts.

(1) Accordingly, an object of the present invention is to provide a video coding device, which is provided with a subband-decomposing means for decomposing an image being composed of N (N≧2) kinds of luminance or chrominance components into subband images for each of components $A^n$ (1≦n≦N, where n is an integer) composing an image to be coded, coefficient coding means for encoding a frequency coefficient of the subband images, rearranging means for preparing integrated component units by combining frequency coefficients included in respective components $A^n$ according to the coded coefficient data prepared by the coefficient coding means and rearranging the prepared integrated component units of the coefficient-coded data in an ascending order of subband image resolution, starting from the integrated component unit including the coded coefficient data of the lowest resolution subband, and a variable-length coding means for performing variable-length encoding of the rearranged coefficient-coded data, wherein the rearranging means prepares each of the integrated component units by setting therein the frequency coefficients contained in the respective components $A^n$, which are all frequency-coefficients included in m (m≧1) pieces of the respective components' subbands, when the components $A^n$ are have the same size and the same number of subbands.

(2) Correspondingly, another object of the present invention is to provide a video decoding device, which is provided with a variable-length decoding means for decoding variable-length coded data, a decoded-data counting means for counting bits of each integrated component unit decoded by the variable-length decoding means, a decoding truncating means for comparing the number of bits counted by the decoded-data counting means with an externally-given number of bits and giving a decoding-stop command when the number of decoded bits exceeds the given number of bits, a component separating means for separating the decoded integrated component unit into respective components $A^n$, a data completing means for compensating for lack of truncated data by adding a specified value to each of the components composing a screenful image, data arranging means for arranging coded coefficient data separated by the component separating means into specified positions for respective components $A^n$, a coefficient decoding means for decoding coded-coefficient data separated and arranged for respective components $A^n$ by the component separating means, and a subband synthesizing means for reproducing a decoded image by combining subbands of data decoded by the coefficient decoding means for respective components $A^n$, wherein the component separating means separates the integrated component unit as combinations of all frequency coefficients contained in m (m≧1) subbands for respective components $A^n$ when the respective components $A^n$ have the same size and the same number of subbands.

The integrated component units contains all frequency coefficients in m (m≧1) respective subbands of respective component $A^n$. Therefore, specified subbands of the image components such as luminance signal Y and chrominance signals U and V that may have different levels of influence on human visual property can be transmitted first to enable one to recognize a summary of the image at an earlier stage of decoding at the decoding side. When a codable image is known to be of higher resolution in a specified direction, the coding device can transmit first coded coefficients of higher-resolution-direction subbands and the decoding device can decode those coded coefficients, terminate the decoding in the midway of decoding all coded data and reproduce the image from only data decoded till that time to improve subjective-image quality of the image.

(3) Another object of the present invention is to provide a video coding device, which is provided with a subband-decomposing means for decomposing an image being composed of N (N≧2) kinds of luminance or chrominance components into subband images for each of components $A^n$ (1≦n≦N, where n is an integer) composing an image to be coded, coefficient coding means for encoding a frequency coefficient of the subband images, rearranging means for preparing integrated component units by combining frequency coefficients included in respective components $A^n$ according to the coded coefficient data prepared by the coefficient coding means and rearranging the prepared integrated component units of the coefficient-coded data in an ascending order of subband image resolution, starting from the integrated component unit including the coded coefficient data of the lowest resolution subband, and a variable-length coding means for performing variable length encoding of the rearranged coefficient-coded data, wherein the rearranging means prepares each of the integrated component units by setting therein the frequency coefficients included in the respective components $A^n$ as m (m≧1) pieces of frequency-coefficients contained at the same relative positions in m (m≧1) pieces of the respective components' subbands when the components $A^n$ have the same size and the same number of subbands.

(4) Correspondingly, another object of the present invention is to provide a video decoding device, which is provided with a variable-length decoding means for decoding variable-length coded data, a decoded-data counting means for counting bits of each integrated component unit decoded by the variable-length decoding means, a decoding truncating means for comparing the number of bits counted by the decoded-data counting means with an externally-given number of bits and giving a decoding-stop command when the number of decoded bits exceeds the given number of bits, a component separating means for separating the decoded integrated component unit into respective components $A^n$, a data completing means for compensating for lack of truncated data by adding a specified value to each of the components composing a screenful image, data arranging means for arranging coded coefficient data separated by the component separating means into specified positions for respective components $A^n$, a coefficient decoding means for decoding coded-coefficient data separated and arranged for respective components $A^n$ by the component separating means, and a subband synthesizing means for reproducing a decoded image by combining subbands of data decoded by the coefficient decoding means for respective components $A^n$, wherein the component separating means separates the integrated component unit into combinations of m ($m \geq 1$) pieces of frequency coefficients having the same relative positions in respective m ($m \geq 1$) subbands of the respective components $A^n$ when the components $A^n$ have the same size and the same number of subbands.

Therefore, the devices operate with integrated component units whose elements are m ($m \geq 1$) pieces of frequency coefficients having the same relative positions in m ($m \geq 1$) respective subbands of respective components $A^n$ and can decode those coded coefficients, terminate the decoding in the midway of decoding all the coded data and reproduce the image from only the data decoded till that time to improve subjective-image quality of the image when the image is composed of components R, G and B that have substantially almost the same influence on human visual property.

(5) Another object of the present invention is to provide a video coding device, which is provided with a subband-decomposing means for decomposing an image being composed of N ($N \geq 2$) kinds of luminance or chrominance components into subband images for each of components $A^n$ ($1 \leq n \leq N$, where n is an integer) composing an image to be coded, coefficient coding means for encoding a frequency coefficient of the subband images, rearranging means for preparing integrated component units by combining frequency coefficients included in respective components $A^n$ according to the coded coefficient data prepared by the coefficient coding means and rearranging the prepared integrated component units of the coefficient-coded data in an ascending order of subband image resolution, starting from the integrated component unit including the coded coefficient data of the lowest resolution subband, and a variable-length coding means for performing variable-length encoding of the rearranged coefficient-coded data, wherein the rearranging means prepares each of the integrated component units by setting therein the different number of frequency-coefficients in the respective components $A^n$ according to each component size when the components $A^n$ are different in size and have the same number of subbands.

(6) Correspondingly, another object of the present invention is to provide a video decoding device, which is provided with a variable-length decoding means for decoding variable-length coded data, a decoded-data counting means for counting bits of each integrated component unit decoded by the variable-length decoding means, a decoding truncating means for comparing the number of bits counted by the decoded-data counting means with an externally-given number of bits and giving a decoding-stop command when the number of decoded bits exceeds the given number of bits, a component separating means for separating the decoded integrated component unit into respective components $A^n$, a data completing means for compensating for lack of truncated data by adding a specified value to each of the components composing a screenful image, data arranging means for arranging coded coefficient data separated by the component separating means into specified positions for respective components $A^n$, a coefficient decoding means for decoding coded-coefficient data separated and arranged for respective components $A^n$ by the component separating means, and a subband synthesizing means for reproducing a decoded image by combining subbands of data decoded by the coefficient decoding means for respective components $A^n$, wherein the component separating means separates the integrated component unit as combinations of different pieces of frequency coefficients according to respective component sizes when the respective components $A^n$ are different in size and have the same number of subbands.

The devices can be adapted to process an image whose luminance and chrominance components are different from each other by resolution, having the great advantage over the conventional method that can be applied to an image whose components have the same resolution. This feature provided by the present invention is desirable in particular to digital image processing since many digital images are usually formatted to have higher resolution of the luminance component than that of chrominance component.

(7) Another object of the present invention is to provide a video coding device, which is provided with a subband-decomposing means for decomposing an image being composed of N ($N \geq 2$) kinds of luminance or chrominance components into subband images for each of components $A^n$ ($1 \leq n \leq N$, where n is an integer) composing an image to be coded, coefficient coding means for encoding a frequency coefficient of the subband images, rearranging means for preparing integrated component units by combining the subbands included in respective components $A^n$ according to the coded coefficient data prepared by the coefficient coding means and rearranging the prepared integrated component units of the coefficient-coded data in an ascending order of subband image resolution, starting from the integrated component unit including the coded coefficient data of the lowest resolution subband, and a variable-length coding means for performing variable-length encoding of the rearranged coefficient-coded data, wherein the rearranging means prepares each of the integrated component units by combining the same number of low-resolution subbands and the different number of high-resolution subbands of the respective components $A^n$ when the components An are different in size and different in the number of subbands.

(8) Correspondingly, another object of the present invention is to provide a video decoding device, which is provided with a variable-length decoding means for decoding variable-length coded data, a decoded-data counting means for counting bits of each integrated component unit decoded by the variable-length decoding means, a decoding truncating means for comparing the number of bits counted by the decoded-data counting means with an externally-given number of bits and giving a decoding-stop command when the number of decoded bits exceeds the given number of bits, a component separating means for separating the decoded integrated component unit into respective components $A^n$, a data completing means for compensating for lack of truncated data by adding a specified value to each of the components composing a screenful image, data arranging means for arranging coded coefficient data separated by the component separating means into specified positions for respective components $A^n$, a coefficient decoding means for decoding coded-coefficient data separated and arranged for respective components $A^n$ by the component separating means, and a subband synthesizing means for reproducing a decoded image by combining subbands of data decoded by the coefficient decoding means for respective components $A^n$, wherein the component separating means separates the integrated component unit as combinations of the same number of low-resolution subbands and the different number of high-resolution subbands of respective components $A^n$ when the respective components $A^n$ are different in size and different in the number of subbands.

The devices can be adapted to process an image whose luminance and chrominance components are different from each other by resolution and have different subband-decomposition levels, getting a great advantage over the conventional method that can be applied to an image whose components have the same resolution and the same number of subbands. This feature provided by the present invention is desirable in particular to digital image processing since many digital images are usually formatted to have higher resolution of the luminance component than that of the chrominance component and it is general to vary the subband-decomposition level according to the resolution of the component.

(9) Another object of the present invention is to provide a video coding device, which is provided with a subband-decomposing means for decomposing an image being composed of N (N≧2) kinds of luminance or chrominance components into subband images for each of components $A^n$ (1≦n≦N, where n is an integer) composing an image to be coded, coefficient coding means for encoding a frequency coefficient of the subband images, rearranging means for preparing integrated component units by combining the subbands included in respective components $A^n$ according to the coded coefficient data prepared by the coefficient coding means and rearranging the prepared integrated component units of the coefficient-coded data in an ascending order of subband image resolution, starting from the integrated component unit including the coded coefficient data of the lowest resolution subband, and a variable-length coding means for performing variable-length encoding of the rearranged coefficient-coded data, wherein the rearranging means prepares each of the integrated component units by combining the same number of high-frequency subbands and the different number of low-frequency subbands of the respective components $A^n$ when the components $A^n$ are different in size and different in the number of subbands.

(10) Correspondingly, another object of the present invention is to provide a video decoding device, which is provided with a variable-length decoding means for decoding variable-length coded data, a decoded-data counting means for counting bits of each integrated component unit decoded by the variable-length decoding means, a decoding truncating means for comparing the number of bits counted by the decoded-data counting means with an externally-given number of bits and giving a decoding-stop command when the number of decoded bits exceeds the given number of bits, a component separating means for separating the decoded integrated component unit into respective components $A^n$, a data completing means for compensating for lack of truncated data by adding a specified value to each of the components composing a screenful image, data arranging means for arranging coded coefficient data separated by the component separating means into specified positions for respective components $A^n$, a coefficient decoding means for decoding coded-coefficient data separated and arranged for respective components $A^n$ by the component separating means, and a subband synthesizing means for reproducing a decoded image by combining subbands of data decoded by the coefficient decoding means for respective components $A^n$, wherein the component separating means separates the integrated component unit as combinations of the same number of high-resolution subbands and the different number of low-resolution subbands of respective components $A^n$ when the components $A^n$ are different sizes and different in the number of subbands.

The devices can be adapted to process an image whose luminance and chrominance components have different resolution levels and different subband-decomposition levels, getting a great advantage over the conventional method that can be applied to an image whose components have the same resolution and the same number of subbands. Furthermore, these aspects of the present invention provide such a feature that each integrated component unit always reflects the ratio of numbers of respective components contained in an input image. This feature eliminates the need for decoding redundant data at the decoding side when decoding the amount of data according to the resolution of the display unit.

(11) Another object of the present invention is to provide a video coding device, which is based on the device of (9) above-mentioned and further characterized in that the rearranging means prepares each of the integrated component units by combining lowest ones of resolution subbands of the respective components $A^n$ and different numbers of all other low-resolution-level subbands of the respective components $A^n$ when the respective components $A^n$ are different in size and different in the number of subbands.

(12) Correspondingly, the present invention also provides a video-decoding device, which is based on the device of (10) above-mentioned and further characterized in that the component separating means separates the integrated component unit into combinations of subbands for respective components, each combination composed of one lowest resolution subband and the different numbers of all other low-resolution subbands.

The devices can first separate and transmit lowest resolution subbands of respective components $A^n$ to first give a summary content of an image, making it possible to improve subjective quality of the reproduced image.

BRIEF DESCRIPTION OF THE DRAWINGS

FIG. 2 is a view for explaining a progressive video transmission system.

FIG. 12 depicts an exemplified sequence of scanning coefficients in respective subbands in the first embodiment of the present invention.

FIG. 13 depicts an example of collecting a plurality of subbands into elements of an integrated component unit in the first embodiment of the present invention.

FIG. 21 depicts an example of subband decomposition and an integrated component unit used in the third embodiment of the present invention.

FIG. 22 depicts another example of subband decomposition and an integrated component unit used in the third embodiment of the present invention.

DESCRIPTION OF THE PREFERRED EMBODIMENT OF THE INVENTION

Prior to explaining preferred embodiments of the present invention, prior art video coding device and video decoding device will be described below as references for the present invention.

Figure 1A:
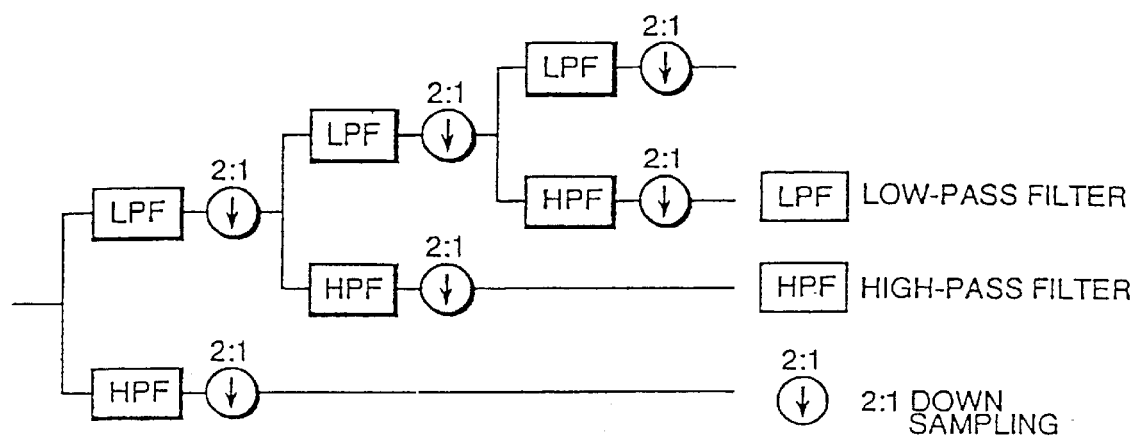
FIG. 1A is a view for explaining a subband coding method.
Figure 1B:
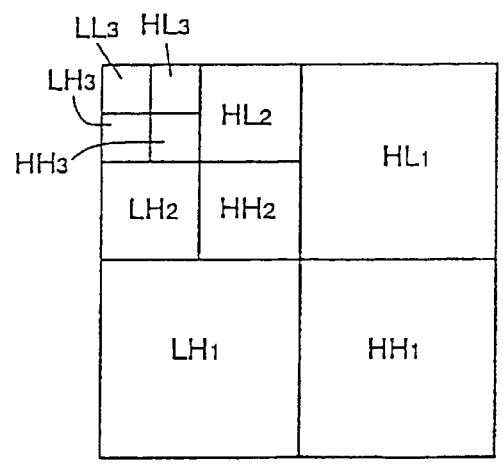
FIG. 1B is a view for explaining a subband coding method.

Recently, there has been proposed a subband coding method that can efficiently encode and decode video signals. The well-known high-efficient subband encoding method is used to decompose an input image into such frequency bands as shown in FIG. 1B by a bank of band-decomposing filters as shown in FIG. 1A. The band-decomposing filter-bank shown in FIG. 1A is a one-dimensional filter-bank that can serve as a two-dimensional band-decomposing filter-bank by repeating processing the input image in horizontal and vertical directions. This method was reported by Fujii, Noumura. "Topics on Wavelet Transform" in a Report of "TECHNICAL REPORT of IEICE, IE92–11, 1992".

In FIG. 1A, there is shown a subband image obtained by conducting two-dimensional subband decomposition three times. The first two-dimensional subband decomposition obtains a horizontal high-pass and a vertical low-pass band, a horizontal low-pass and vertical high-pass band and a horizontal and vertical high-pass band, which are designated by HL1, LH1 and HH1 respectively. A horizontal and vertical low-pass band obtained by the first decomposition is further subjected to two-dimensional band-decomposition by which three subbands HL2, LH2 and HH2 are obtained.

A horizontal and vertical low-pass subband obtained by the second decomposition is further subjected to third two-dimensional subband decomposition by which three subbands HL3, LH3 and HH3 and a horizontal and vertical low-pass subband LL3 are obtained. A Wavelet-converting filter-bank or a band-decomposing and synthesizing filter-bank may be used as the band-decomposing filter-bank. Thus, the decomposed subband-images are of a hierarchical (layer) structure from low-frequency band to high-frequency band.

Progressive image transmitting can be easily realized utilizing the hierarchical structure of the subband images. As shown in FIG. 2, the progressive image transmitting method enables a video decoding device to reproduce a low-resolution image by using only a part of coded data. The more coded data is reproduced, the higher resolution the decoded image has. Japanese Laid-Open Patent Publication (TOKKAI HEI) No. 8-242379 describes a system (referred hereinafter to as a prior art system) to realize the progressive image transmitting, which structure is shown in FIGS. 3 and 4.

Figure 3:
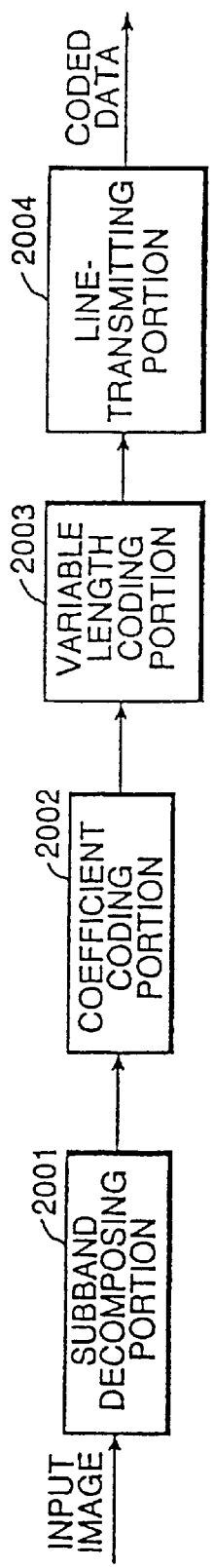
FIG. 3 is a block-diagram of a prior art video coding device.
Figure 4:
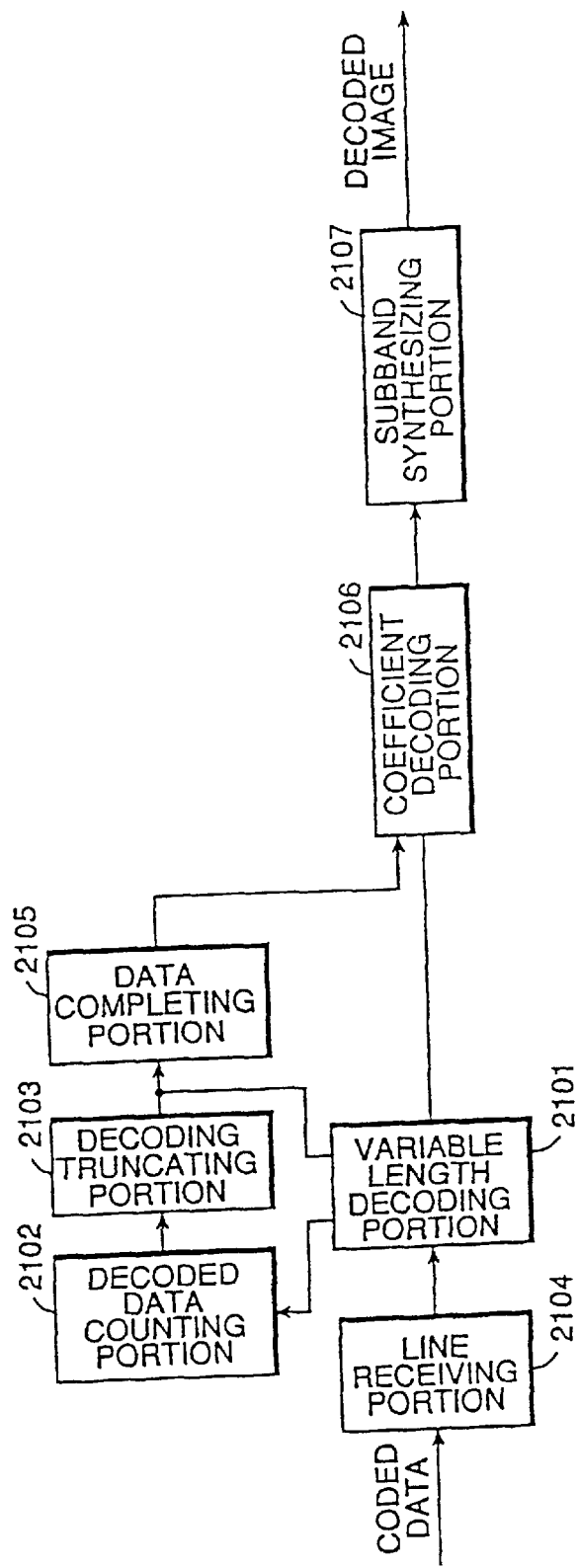
FIG. 4 is a block-diagram of a prior art video decoding device.

FIG. 3 shows a video coding device using in the prior art system and FIG. 4 shows a video decoding device using the system. The video coding device as shown in FIG. 3 includes a subband decomposing portion 2001 for decomposing an input image into subband images by using two-dimensional decomposing filters, a coefficient coding portion 2002 for encoding coefficients of the decomposed subband images, a variable-length coding portion 2003 for performing variable-length coding of the coded coefficient data from the coefficient coding portion 2002 and a line-transmitting portion 2004 for transmitting a plurality of components composing the image per line at a time. The coefficient coding portion 2002 performs encoding the coefficients by using any one of various kinds of coding methods (e.g., DPCM coding, zero-tree coding, and scalar-quantizing coding). This process includes a quantizing step.

The operation of the line transmitting portion 2004 will be described below in detail, by way of example, with an input image composed of three-components Y (a luminance component) and U, V (chrominance components) and being conducted subband decomposition three times as shown in FIG. 1B. Processing starts from a subband LL3 shown in FIG. 1B, which gives the lowest resolution of the image.

Figure 5:
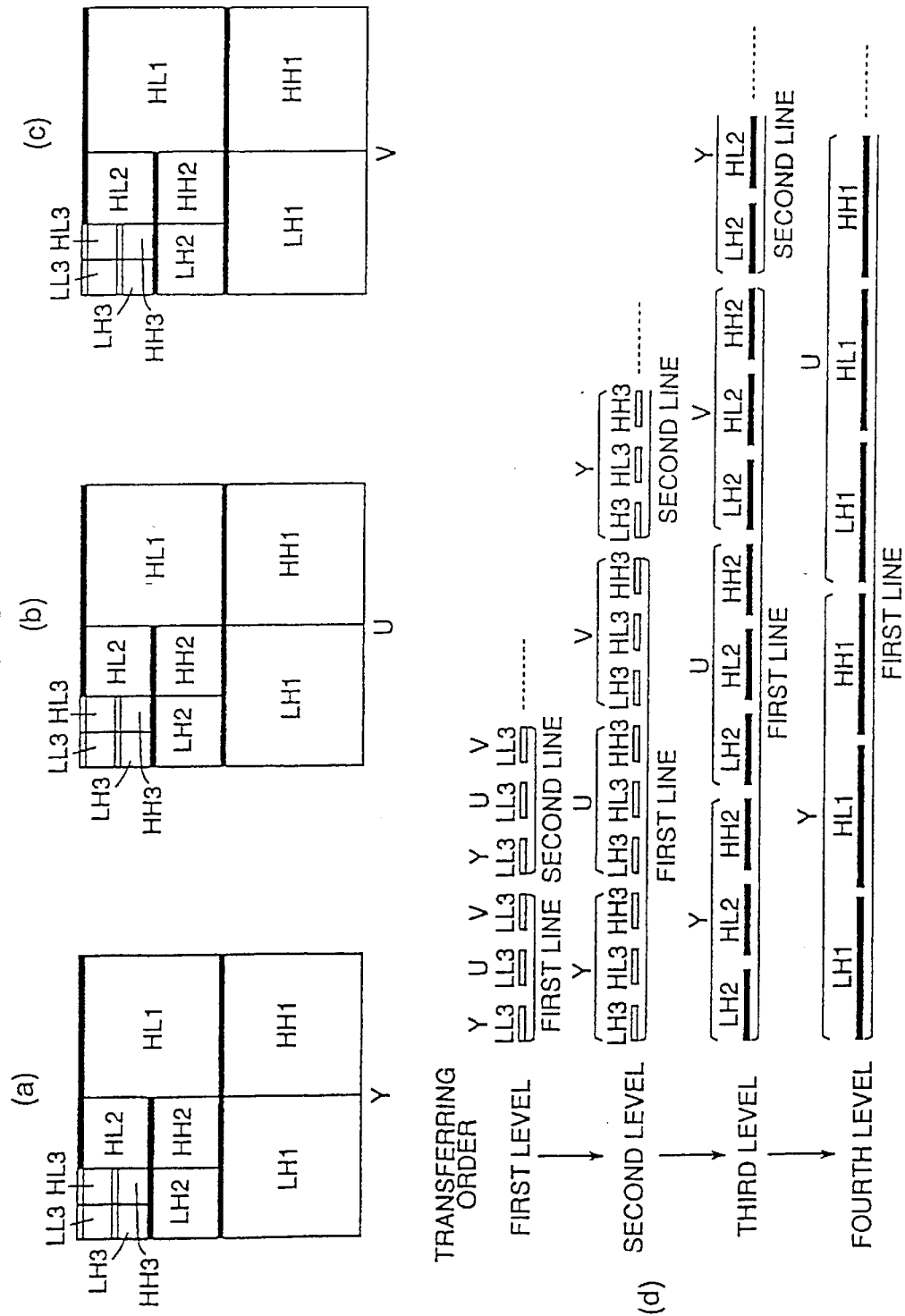
FIG. 5 depicts a sequence of transferring subband image coefficients according to the prior art video coding device.
Figure 6:
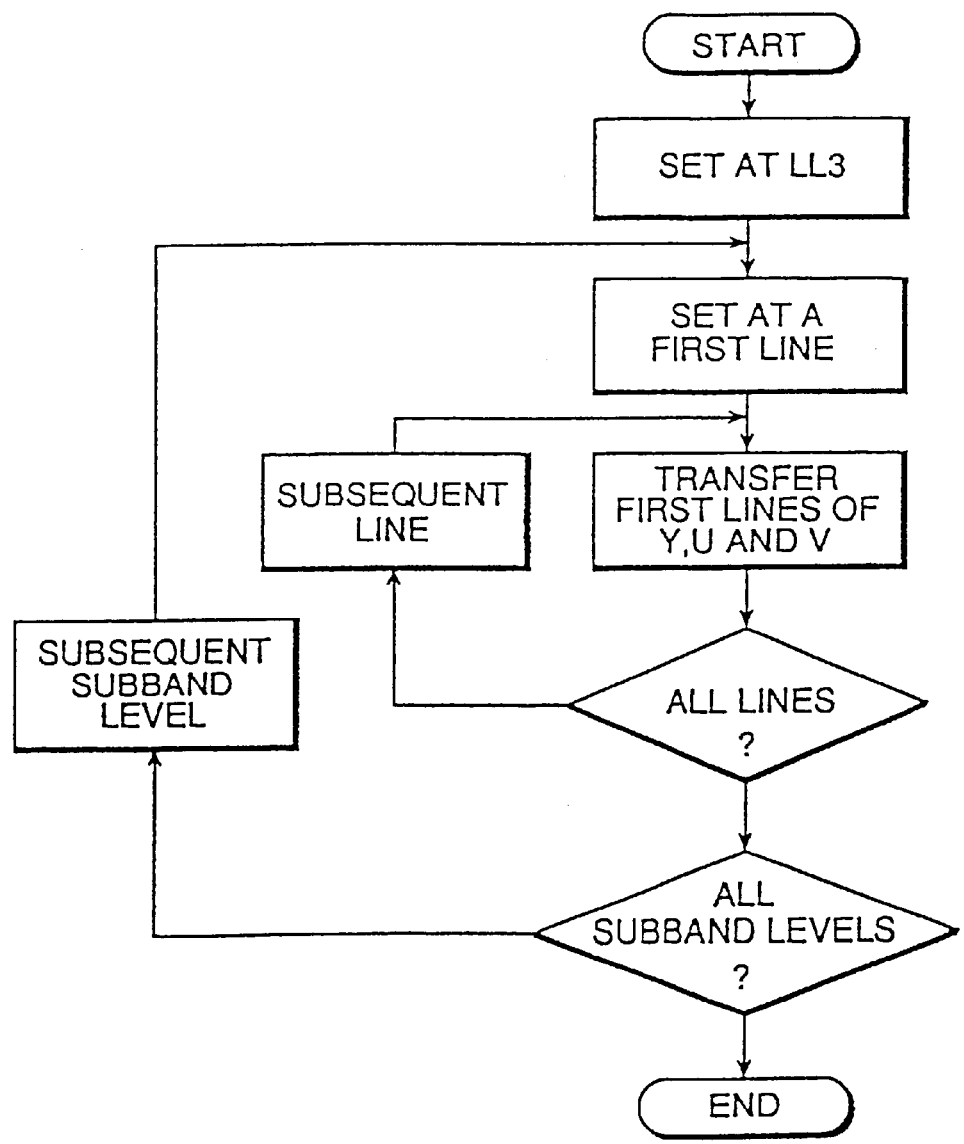
FIG. 6 is a flow chart for explaining the operation of a prior art video coding device.

As shown in FIG. 5, the line-transmitting portion 2004 transmits the components Y, U and V sequentially line by line in the order from the first line of the subband LL3. Having transferred all lines of the subband LL3, the portion transfers the components Y, U and V in the subbands LH3, HL3 and HH3 respectively in the order: the component Y on the first lines of the subbands LH3, HL3 and HH3; the component U on the first lines of the subbands LH3, HL3 and HH3; the component V on the first lines of the subbands LH3, HL3 and HH3; the component Y on the second lines of the subbands LH3, HL3 and HH3; U on the second lines of LH3, HL3 and HH3; V on the second lines of the subbands LH3, HL3 and HH3 and so on. Having transmitted all lines of LH3, HL3 and HH3, the line transmitting portion transfers, in similar way, lines of LH2, HL2, HH2 and, then, lines of LH1, HL1, HH1. The above-mentioned procedure of the line-transmitting portion 2004 is illustrated by a flowchart of FIG. 6.

Orderly transmission of the components Y, U, V composing the image per line produces coded data having a hierarchical structure.

Referring to FIG. 4, the video decoding device includes a line receiving portion 2104 for receiving the coded data from the line-transmitting portion 2004 of the video-coding device of FIG. 3 and rearranging the data to respective component groups, a variable-length decoding portion 2101 for decoding the rearranged variable-length-coded data, a decoded data counting portion 2102 for counting bits of data decoded by the variable-length decoding portion, a decoding truncating portion 2103 for comparing the number of the bits counted by the decoded-data counting portion with a preset threshold or an externally-given threshold to give a command for stopping the decoding operation of the variable-length decoding portion 2101 when the number of decoded bits exceeds the threshold, a data completing portion 2105 for compensating for lack of truncated data by adding zero when having truncated the decoding the coded data at the specified number of bits, a coefficient decoding portion 2106 for decoding coded coefficient data by reversing the same processing procedure of the coefficient coding portion 2002 of FIG. 3 and a subband synthesizing portion 2107 for synthesizing an image from the subbands through two-dimensional synthesizing filters.

The video decoding device can thus reproduce an entire image from coded data having a hierarchical structure or a part thereof.

The conventional video-coding and video-decoding system can realize progressive image transmitting by transmitting image components per line in an ascending order starting from the lowest-resolution band-image. However, the prior art system encounters several inconvenient problems resulting from the fixed transfer-unit of a line. For example, an image composed of luminance component Y and chrominance components U and V may be more easily recognized by transmitting only the component Y before the components U and V rather than transmitting all components as a unit.

In this case, it is preferable to transfer the image components subband by subband, not by line. Furthermore, it is proved that an image composed of components R, G, B may be reproduced with better subjective image-quality at the decoding terminal when coded coefficients of the respective components R, G and R are transmitted one by one. This is because these components have substantially almost the same influence on the visual property.

The prior art system presumes that components of an image have the same size. Therefore, it cannot be adaptable to an input image composed of different sizes of components in format of, e.g., 4:2:2 or 4:2:0.

Furthermore, the prior art system presumes that respective components of an image have the same number of subbands and cannot be adaptable to an input image whose components are decomposed into different numbers of subbands.

Referring now to accompanying drawings, a video-coding device and a video decoding device according to the present invention will be described below in detail.

Figure 7:
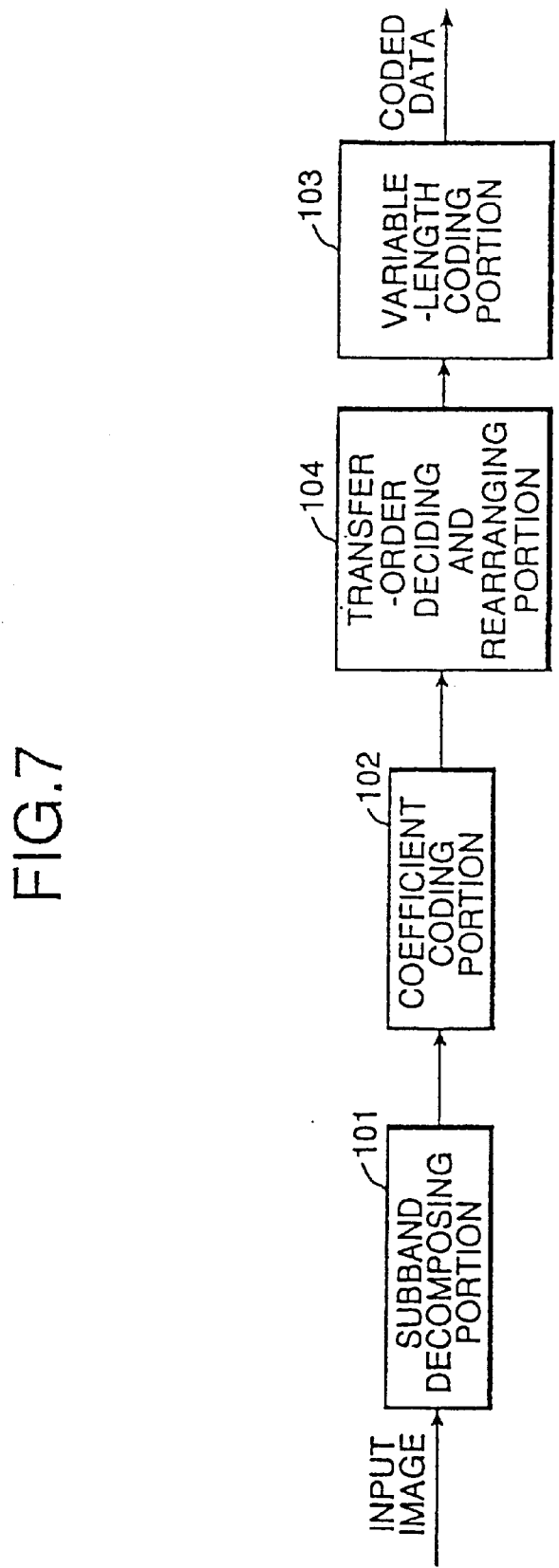
FIG. 7 is a block-diagram of a video coding device which is a first embodiment of the present invention.

FIG. 7 is a block diagram showing a video coding device which is a first embodiment of the present invention. As shown in FIG. 7, the first embodiment of the present invention includes a subband decomposing portion (subband decomposing means) 101, a coefficient coding portion (coefficient coding means) 102 and a variable-length coding portion (variable-length coding means) 103, which are similar in construction to portions 2001, 2002 and 2003, respectively, of FIG. 3.

In FIG. 7, numeral 104 designates a transfer-order deciding and rearranging portion that decides an integrated component unit prepared by combining luminance or chrominance elements from coded coefficient data provided from the coefficient coding portion 102 and arranges coded coefficient data of subbands in a transmitting order starting from the coded coefficient data of the lowest-resolution subband. Whereas the prior art video-coding device rearranges coded coefficient data in the transmitting order after variable-length coding of the data, the video-coding device according to the present invention rearranges the coded coefficient data in the transmitting order before variable-length coding of the data.

This makes it possible to conduct variable-length coding of the coded coefficient data by, e.g., an arithmetic coding method besides the Huffman coding method. According to the present invention, it is also possible to conduct rearrangement of the coded coefficient data after variable-length coding as the prior art device does. The operation of the first embodiment is described below with an input image composed of three components Y (luminance), U (chrominance) and V (chrominance), which is the same as that used in the prior art device. In this embodiment, these components have the same resolution, i.e., the same image sizes.

An integrated component unit may be prepared from coefficient-coded data by combining elements Y, U and V. The following example is an integrated component unit that is prepared of subbands of Y, U and V.

Figure 9:
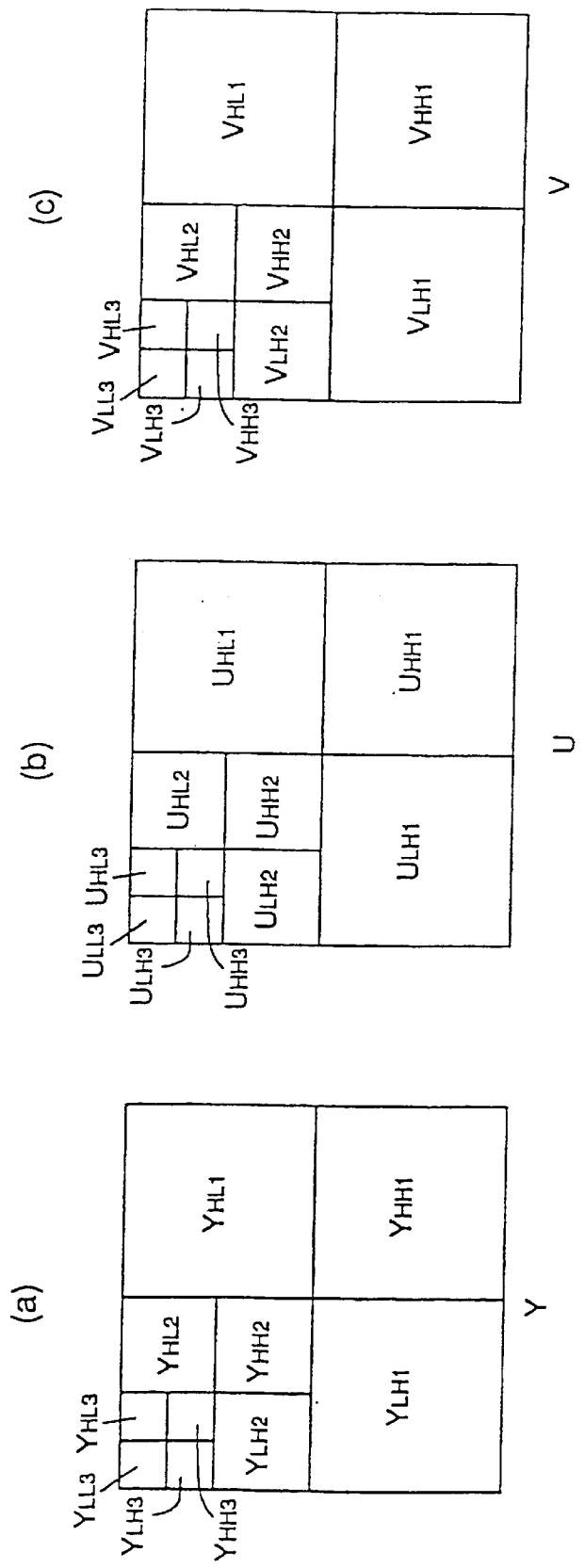
FIG. 9 depicts an example of decomposing image components into subbands in the first embodiment of the present invention.
Figure 10:
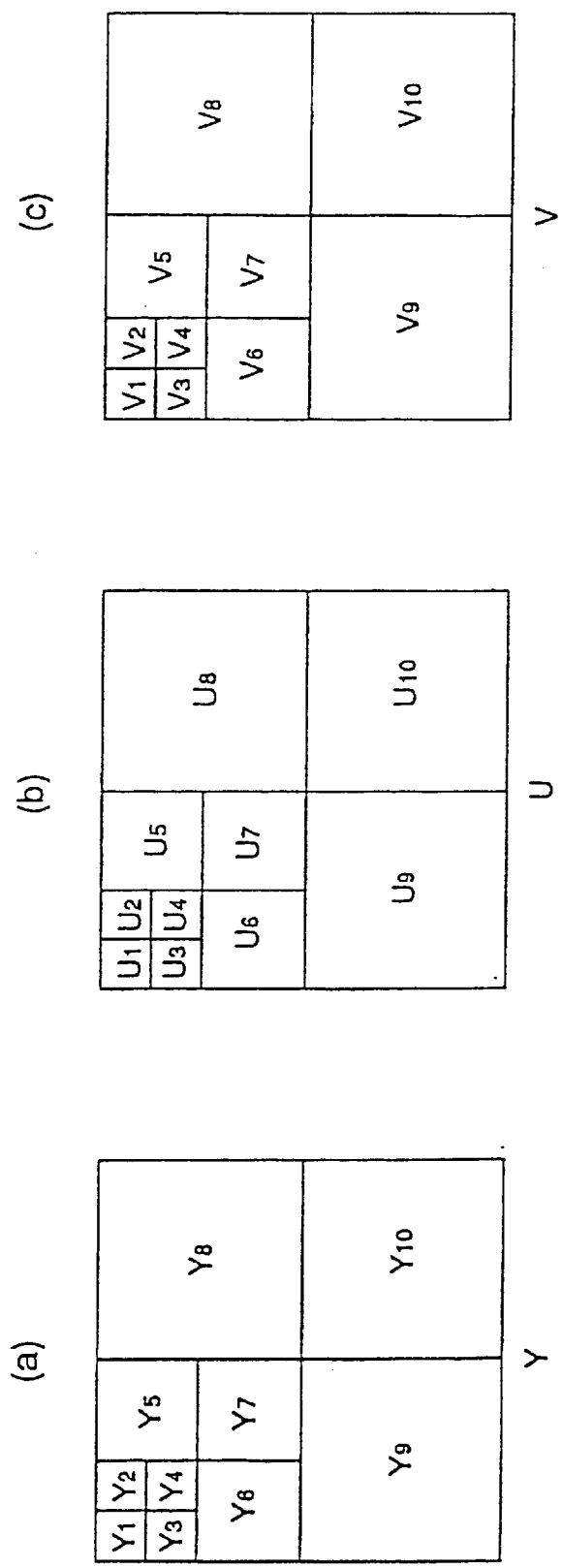
FIG. 10 depicts an example of a sequence of transferring coefficients of subband images in the first embodiment of the present invention.
Figure 11:
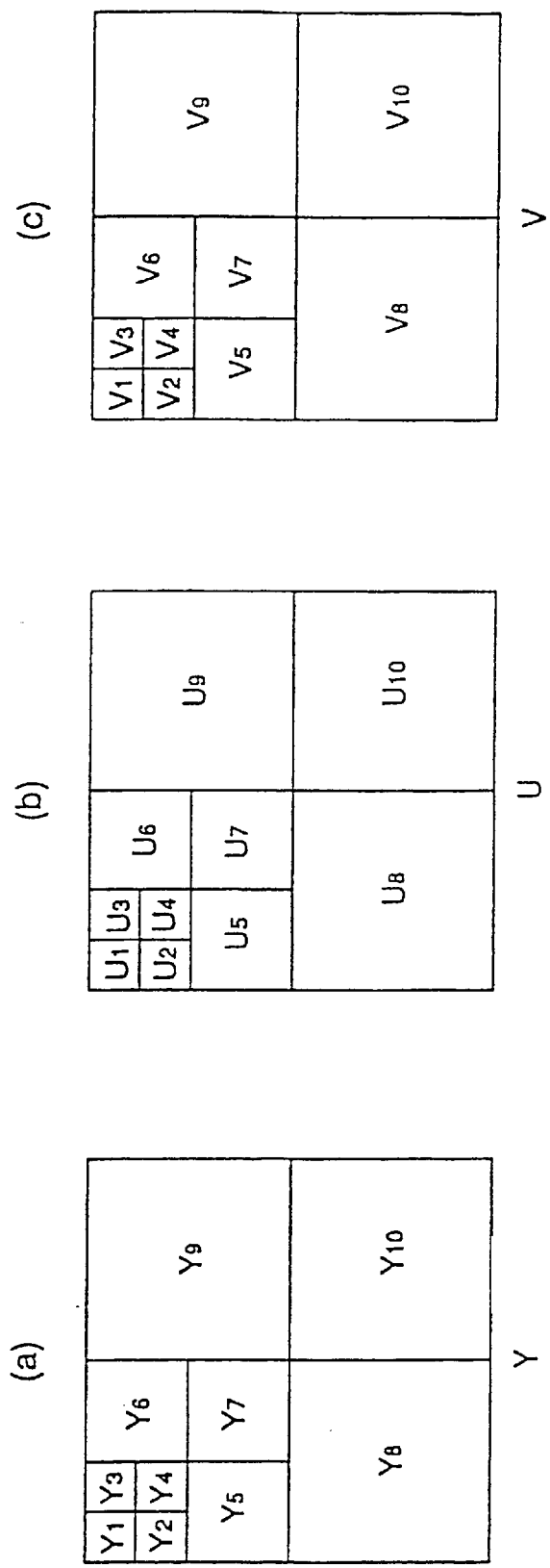
FIG. 11 depicts another example of a sequence of transferring coefficients of subband images in the first embodiment of the present invention.

FIG. 9 shows coefficients of subband images obtained through performing the subband-decomposition of respective image components Y, U and V three times ((a), (b) and (c) part of FIG. 9, respectively). The image sizes of the components Y, U and V are equal to each other. FIGS. 10 and 11 show the order of transmitting the subband image coefficients of Y, U and V ((a), (b) and (c) part of both of FIG. 10 and FIG. 11) in FIG. 9, respectively. Characters Y, U and V with numeral suffixes in both of FIGS. 10, 11 denote the order of transmitting subbands of respective components.

In the first embodiment, an integrated component unit is composed of subbands and contains a set of the same-resolution subbands of respective components, that is: ($Y_1$, $U_1$, $V_i$) where i=1 to 10 (the order of subbands to be transferred).

The transmitting order is as follows: ($Y_1$, $U_1$, $V_1$), ($Y_2$, $U_2$, $V_2$), . . . , ($Y_{10}$, $U_{10}$, $V_{10}$).

In the case of FIG. 10, a coefficient of high resolution in a horizontal direction is transferred before a coefficient of high resolution in vertical direction, while in the case of FIG. 11, a coefficient of high resolution in a vertical direction is transferred before a coefficient of high resolution in horizontal direction. Accordingly, the resolution of the image reproduced at the decoding side can be improved first in the horizontal direction in the case of FIG. 10 and first in the vertical direction in the case of FIG. 11.

Processing of coefficients within a subband may be performed in any of the orders shown in FIG. 12.

The subband is horizontally scanned from above left to below right (part designated by (1) of FIG. 12) or vertically scanned from above left to below right (part (2) of FIG. 12) or scanned spirally from the center of the subband to the outside thereof (part (3) of FIG. 12). In FIG. 12, coefficients in a subband are processed by one scanning as shown in each part (a) of parts (1) to (3) and coefficients in a subband are processed by scanning twice as shown in each parts (b) and (c) of the parts (1) to (3) respectively.

In part (c) in FIG. 12, each arrow shows a coefficient or a set of plural (t) coefficients. A set of (t) coefficients is transferred in the direction indicated by the arrow, a subsequent set of (t) coefficients is not transferred and a further subsequent set of (t) coefficients is transferred in the direction indicated by the arrow. This steps are repeated in first scanning process. The coefficients not-transferred in the first scanning process (shown as arrows with solid lines) are transferred in the second scanning process (shown as arrows with broken lines) in the similar way as in the first scanning process.

As shown in parts (4) and (5) of FIG. 12, it is also possible to process coefficients of a subband by scanning three or more times. For example, a horizontal interval and a vertical interval between coefficients to be processed by n-th scan are expressed as dx and dy respectively. If dx=dy=1, all coefficients are encoded by one raster scan. If dx=dy=2 and horizontal and vertical positions of codable coefficients are determined as (y, x), the first scan encodes coefficients at the positions (0, 0), (0, 2), (0, 4) . . . (2, 0), (2, 2), (2, 4) . . . (4, 0), (4, 2), (4, 4) . . . ;
the second scan encodes coefficients at the positions (0, 1), (0, 3), (0, 5) . . . (2, 1), (2, 3), (2, 5) . . . (4, 1), (4, 3), (4, 5) . . . ;
the third scan encodes coefficients at the positions (1, 0), (1, 2), (1, 4) . . . (3, 0), (3, 2), (3, 4) . . . (5, 0), (5, 2), (5, 4) . . . ;
the fourth scan encodes coefficients at the positions (1, 1), (1, 3), (1, 5) . . . (3, 1), (3, 3), (3, 5) . . . (5, 1), (5, 3), (5, 5). In short, all coefficients are encoded by four scans.

By generalizing this process as (dx=DX, dy=DY), the first scan in case of part (1) in FIG. 12 encodes coefficients, as shown part (4) in FIG. 12 at the positions of (0, 0), (0, DX), (0, 2*DX) . . . ;
the second scan encodes coefficients at the positions (0, 1), (0, DX+1), (0, 2*DX+1) . . . ;
the third scan encodes coefficients at the positions (0, 2), (0, DX+2) . . . (0, 2*DX+2) . . . ;
. . .
DX round scan encodes coefficients at the positions (0, DX-1), (0, 2*DX-1), (0, 3*DX-1) . . . ;
(DX+1) round scan encodes coefficients at the positions (1, 0) (1, DX), (1, 2*DX) . . . ;
(DX+2) round scan encodes coefficients at the positions (1, 1) (1, DX+1), (1, 2*DX+1) . . . ;
. . .
(DX*DY) round scan encodes coefficients at the positions (DY-1, DX-1) (DY-1, 2*DX-1), (DY-1, 3*DX-1) . . . (2*DY-1, DX-1) (2*DY-1, 2*DX-1), (2*DY-1, 3*DX-1).
In short, all coefficients are encoded by (DX*DY) scans. Part (2) in FIG. 12 is reverse to part (1) in FIG. 12 as to vertical and horizontal directions. The coefficients can be processed by scanning as shown in part (5) FIG. 12 at horizontal and vertical intervals of (dx=DX, dy=DY).

In comparison with coefficients encoded by raster scanning from the top left of a frame, the subband coefficients encoded by scanning at intervals provided between the respective coefficients can reproduce an image whose content can be recognized at an earlier stage of decoding and which image can give better subjective impression by the effect of gradually improving the quality of the decoded image.

An example of an integrated component unit containing a plurality of subbands included in the respective components is described below. FIG. 13 shows another transmitting order of coefficients of the subband image of FIG. 9. In a part of (b) of FIG. 13, there is presented an example of encoding a subband image in four layers. Blocks ($Y_2$, $Y_3$, $Y_4$), ($U_2$, $U_3$, $U_4$) and ($V_2$, $V_3$, $V_4$) of in the part (b) of FIG. 13 consist each of three (m=3) subbands as shown in a part (a) of FIG. 13.

Namely, three subbands (1, 2, 3) shown in the part (a) of FIG. 13 correspond to one element set in an integrated component unit. As these three subbands are treated as one element, three coefficients having the same relative positions in respective three subbands are treated as one set as shown in a part (c) of FIG. 13.

Three coefficients existing at the same relative positions in the respective three subbands in FIG. 13 are supposed as one coefficient, i.e., a (coefficient $Y_{HL1}$, coefficient $Y_{LH1}$, coefficient $Y_{HH1}$) are represented by a (coefficient $Y_4$). The component Y in each of the layers shown in the part (b) of FIG. 13 is transferred first in the scanning order shown in FIG. 12. Similarly, the component U is transferred next and the component V is then transferred. Coefficients of subband images of the same resolution levels in horizontal, vertical and diagonal directions are transmitted together from the coding side, so the resolutions of a reproduced image in horizontal, vertical and diagonal directions are increased at a time at the decoding side.

According to another method for treating three subbands as one element, a subband 1 is first transmitted completely, a subband 2 is then transmitted completely and a subband 3 is finally transmitted. Referring to FIG. 13, the subband 1 of the component Y is transmitted in the scanning order shown in FIG. 12. Next, the subband 2 of the component Y is transmitted in the same scanning order and then the subband 3 of the component Y is transmitted in the same scanning order. Subsequently, the subbands 1, 2 and 3 of the component U are transmitted one by one in the same scanning order as that for the component Y. Finally, the subbands 1, 2 and 3 of the components V are transmitted one by one in the same scanning order as that for the component Y.

An integrated component unit includes elements (the subband 1 of the component Y, the subband 2 of the component Y, the subband 3 of the component Y, the subband 1 of the component U, the subband 2 of the component U, the subband 3 of the component U, the subband 1 of the component V, the subband 2 of the component V, the subband 3 of the component V). In this case, resolution of an image reproduced at a decoding side is increased in a horizontal direction, vertical direction and diagonal direction in the described order. Transmission of these three subbands in the order of subband 2, subband 1 and subband 3 causes an increase in resolution of the image in the horizontal, vertical and diagonal directions in the described order at the decoding side.

Several examples of transmitting subband coefficients may be selectably used. In case if a codable image is known to be of higher resolution in a specified direction, coefficients of a subband in the known high-resolution direction are transferred first at the coding side and the transferring order is rearranged at the decoding side to earlier reproduce the coefficients of the subband image in the known high-resolution direction. This makes it possible to increase the quality of images in the decoding process at the decoding side. In this instance, it is necessary to inform the decoding side of the transmitting order in which coefficients are encoded by placing such information in the coded data.

The transmitting-order deciding/rearranging portion 104 shown in FIG. 7 decides integrated component units (in the case of FIG. 9) to be of subbands ($Y_i$, $U_i$, $V_i$), where i=1 to 10 indicating the order of transmitting subbands), rearranges subbands in the order of $(Y_1, U_1, V_1)$, $(Y_2, U_2, V_2)$, ..., $(Y_{10}, U_{10}, V_{10})$ as shown in FIGS. 10 and 11 or in the order of $(Y_1, U_1, V_1)$, $(Y_2, U_2, V_2)$, ..., $(Y_4, U_4, V_4)$ as shown in the part (b) of FIG. 13 and, then, outputs the rearranged coefficient-coded data to the variable-length coding portion 104.

Although the above-mentioned embodiment treats all coefficients in a subband as one group, it may also prepare an integrated component unit by using a coefficient or a plurality of coefficients in a subband as a group. The following example treats one line in a subband as a group of coefficients.

Figure 14:
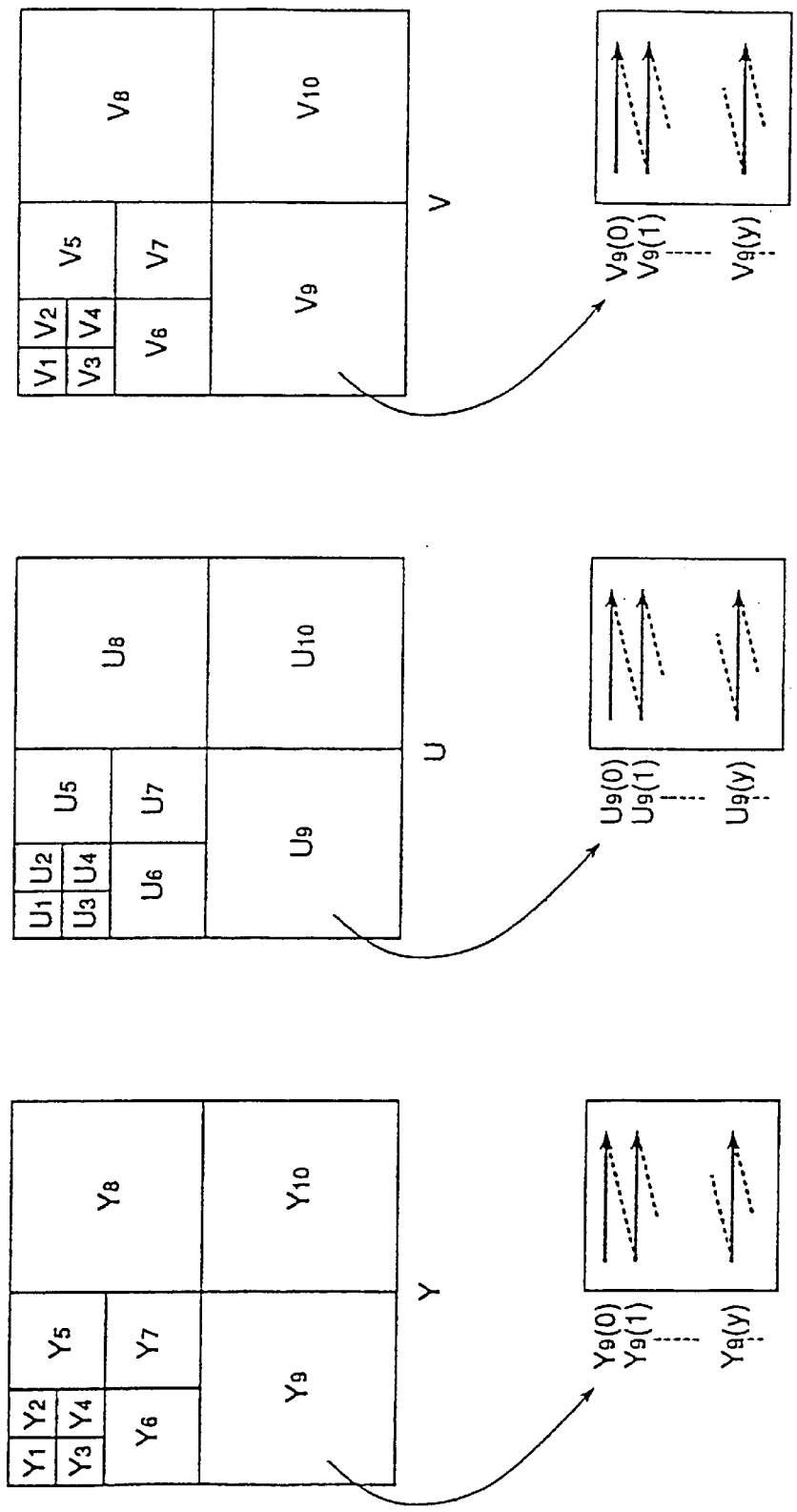
FIG. 14 depicts an example of using coefficients of each line in each subband as an element of an integrated component unit in the first embodiment of the present invention.

FIG. 14 shows an integrated component unit having horizontal lines in each of the subbands, which is expressed as follows:

$(Y_1(y), U_1(y), V_1(y))$ where $Y_1(y), U_1(y), V_1(y)$ are one-line data of respective subbands Y, U and V, i=1 to 10 indicates the order of transferring subbands and y denotes each line number in subbands.

In this instance, the order of transferring the integrated component units is as follows:

$(Y_1(0), U_1(0), V_1(0)), (Y_1(1), U_1(1), V_1(1)), \ldots,$
$(Y_2(0), U_2(0), V_2(0)), (Y_2(1), U_2(1), V_2(1)), \ldots,$
$\ldots,$
$(Y_{10}(0), U_{10}(0), V_{10}(0)), (Y_{10}(1), U_{10}(1), V_{10}(1)), \ldots$ In FIG. 14, an integrated component unit has horizontal lines in each of the subbands, which corresponds to the scanning order shown in the part (a) of part (1) of FIG. 12. Besides this, it is also possible to prepare an integrated component unit composed of vertical lines one in each of the subbands as shown in the part (a) of the part (2) of FIG. 12. In this instance, components Y, U, V may be expressed each by one arrow. This processing is done on all subbands in the order shown in FIG. 10, FIG. 11 or the part (b) of FIG. 13.

It is also possible to prepare an integrated component unit composed of coefficients in each of the subbands, which is expressed as:

$(Y_i(y, x), U_i(y, x), (V_i(y, x))$, where $Y_i(x, y), U_i(x, y), V_i(x, y)$ are coefficients one in respective subbands Y, U and V, i=1 to 10 indicates the order of transferring subbands, y denotes a position in vertical direction in a subband, x denotes a position in horizontal direction in a subband. In this instance, the transmitting order may be any of the orders shown in parts (1), (2) and (3) of FIG. 12. The processing is made on all subbands in the order shown in FIG. 10, FIG. 11 or the part (b) of FIG. 13.

Figure 15:
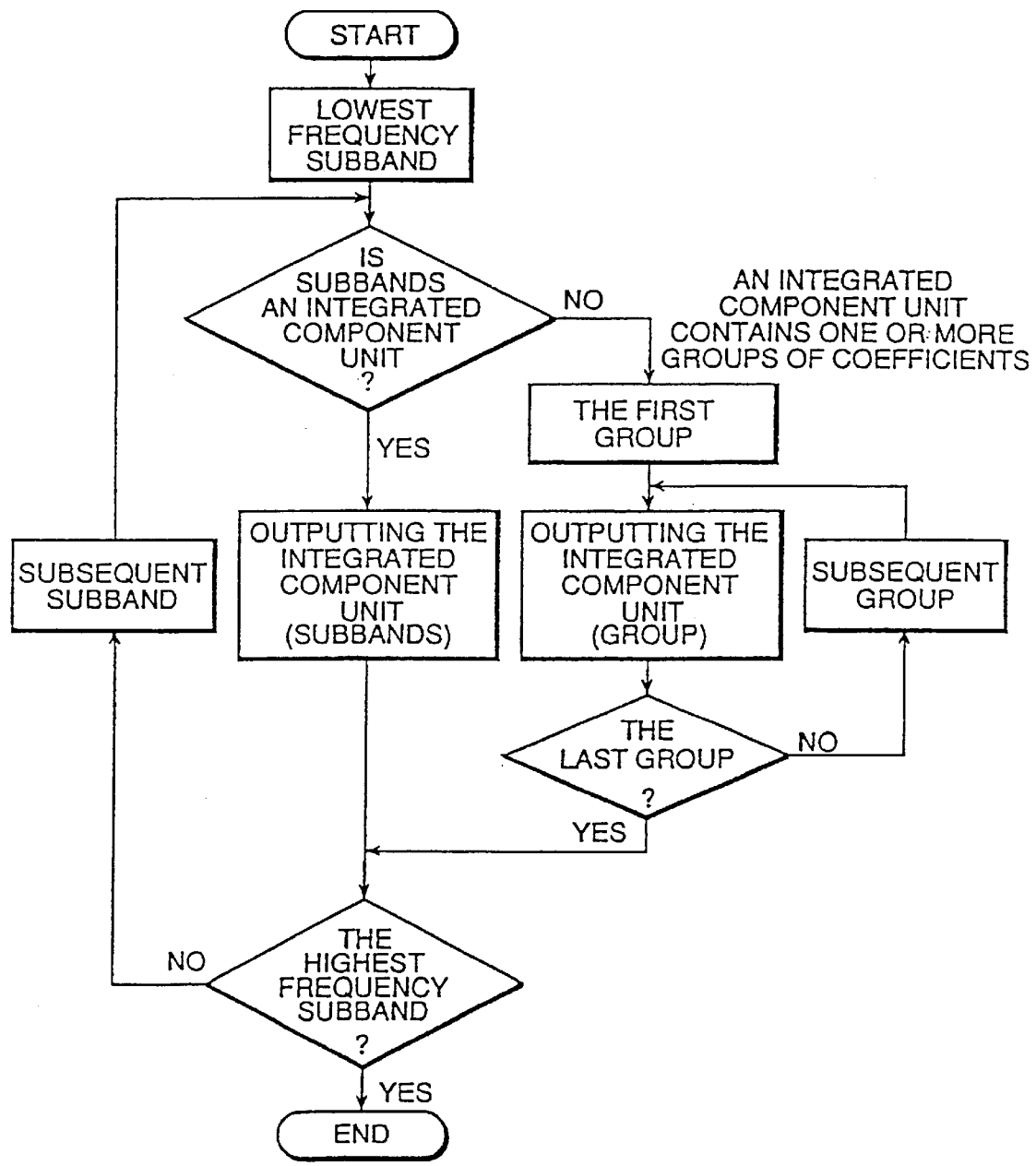
FIG. 15 is a flow chart depicting a procedure of operations of a video coding device which is the first embodiment of the present invention.

FIG. 15 is a flow chart depicting an example of the operation of the transmitting order deciding and rearranging portion 104 of FIG. 7. In the shown case, the integrated component unit may be changed over from the subbands to coefficients (one or more groups of coefficient) or vice versa. The portion may be designed to operate by using only one of the two units.

The video coding device according to the first embodiment of the present invention can prepare coded data having a hierarchical structure by decomposing an input image composed of a plurality of components Y, U and V into subband images and encoding the subband images in an ascending order of their resolution starting from the lowest-resolution subband.

In comparison with the conventional device that integrates components Y, U and V according to only the scanning line base, the first embodiment of the present invention can perform adaptive encoding input video data in view of the data characteristics by applying integrated component units according to subband-based and/or coefficient-based integration of the components Y, U and V.

Figure 8:
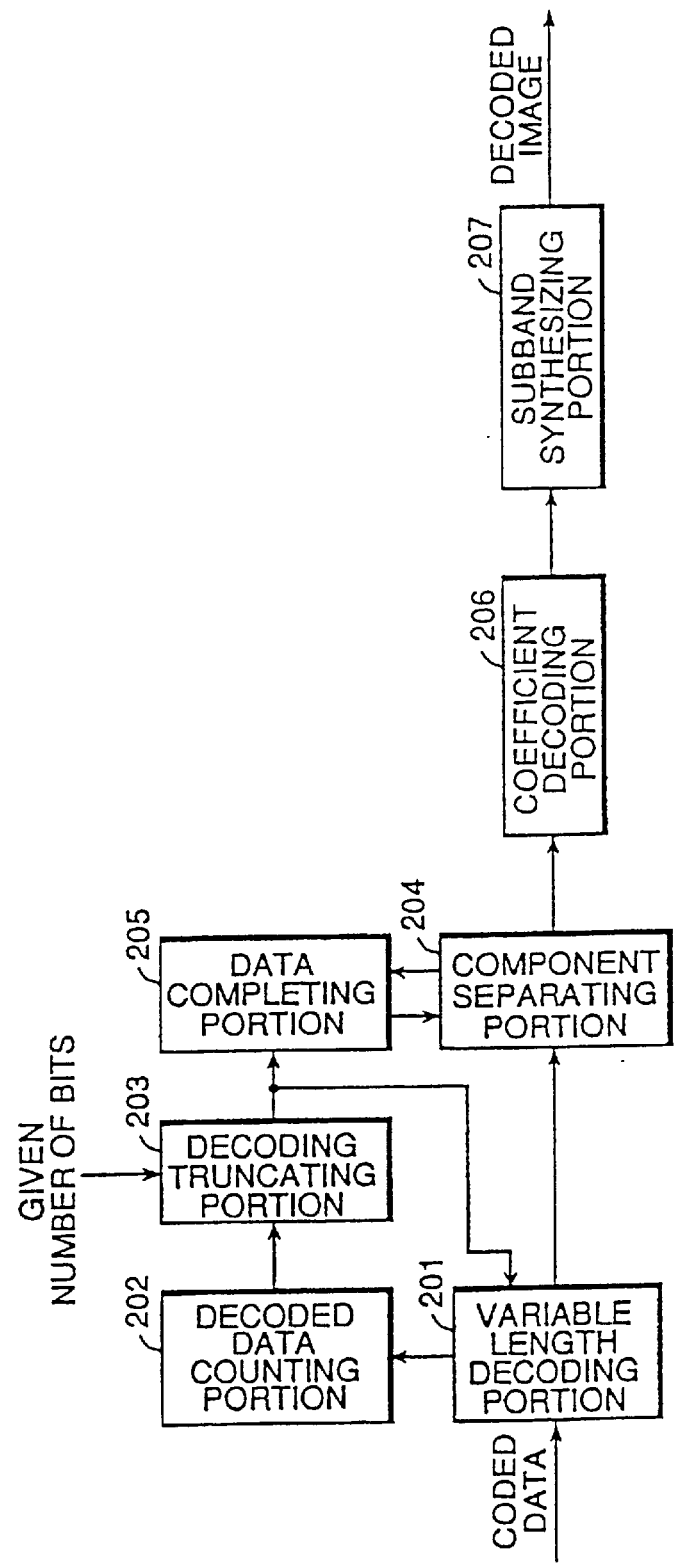
FIG. 8 is a block-diagram of a video decoding device which is a first embodiment of the present invention.

Referring now to FIG. 8, a video decoding device embodying the present invention will be described below in detail. This video decoding device is intended to decode video data prepared by the video coding device according to the first embodiment of the present invention.

In FIG. 8, the video-decoding device includes a variable-length decoding portion 201, a decoded-data counting portion 202, a decoding truncating portion 203, a data completing portion 205, a coefficient decoding portion 206 and a subband synthesizing portion 207. These portions are similar in construction to the portions a variable-length decoding portion 2101, a decoded data counting portion 2102, a decoding truncating portion 2103, a data completing portion 2105, a coefficient decoding 2106 and a subband synthesizing portion 2107, respectively, of FIG. 4.

In FIG. 8, numeral 204 designates a component separating portion for separating coefficient-coded data rearranged by the transfer-order deciding and rearranging portion of the coding device into data for respective components. The component separating portion 204 rearranges coded data into respective component groups Y, U and V by inverting the procedures that the coding side did.

Accordingly, the component separating portion 204 has a memory (not shown) for storing respective components Y, U and V. This memory has basically the same capacity that the subband decomposing portion 101 of the video coding device has. However, this portion may be designed to separate an integrated component unit into coefficients for respective component groups Y, U, V and output the separated coefficients to the coefficient decoding portion 206 on completion of separation of the integrated component unit. In this instance, the portion may have enough memory to store the largest integrated-component unit only.

The component separating portion 204 may also be designed to work by successively separating and outputting coefficients of an integrated component unit to the coefficient decoding portion 206. In this case, the component separating portion 204 may have enough memory to store a plurality of separated coefficients irrespective of the size of any integrated component unit to be separated. The separated coefficients outputted from the component separating portion 204 are decoded by the coefficient decoding portion 206 and then stored in a memory (not shown) of the coefficient decoding portion 206. In this case, the coefficient decoding portion 206 includes decoded-data arranging means.

Furthermore, it is also possible to write the decoded coefficients in a memory (not shown) for storing frequency-coefficients to be input into the subband synthesizing portion 207.

As described above, the coefficients separated by the component separating portion 204 may be stored in a variety of memory units. For the convenience of further explanation, the component separating portion 204 separates integrated component units by writing separated coefficients in its memory having the same capacity as the memory of the subband decomposing portion 204 of the video coding device.

For example, an integrated component unit composed of subband data $(Y_1, U_1, V_1)$ is decomposed into separate elements $Y_1$, $U_1$ and $V_1$ respectively. The separated elements Y, U and V are written into corresponding subbands positions in a memory. Next, a unit $(Y_2, Y_2, V_2)$ is decomposed into separate elements $Y_2$, $U_2$ and $V_2$ that are then written in specified positions of the corresponding subbands in the memory for storing Y, U and V. This processing is done on all the subbands.

In this instance, the order of decoding coefficients in each subband is the same as described the process shown in FIG. 12. For example, the coding side performed scans as shown in the part (1) of FIG. 12, so the decoding side must do scans as shown in the part (1) of FIG. 12. The application of this scanning method causes an image in the decoding process to have resolution increasing in the order of raster scanning from the top left to the down right.

In a particular case when coefficients were encoded by scanning with spacing between them as shown in the part (4) or (5) of FIG. 12, an image being decoded can be easily recognized at an earlier stage of decoding as compared with the raster scanned image. The image may be gradually improved in resolution level, so the image may have better subjective-image quality.

The operation of the component separating portion 204 when processing an integrated component unit composed of one or more groups (sets) of coefficients in subbands is as follows:

Assuming one line in a subband is considered as a group of coefficients, an integrated component unit is expressed as $(Y_i(y), U_i(y), V_i(y))$ where $Y_i(y), U_i(y), V_i(y)$ are one-line data of respective subbands Y, U and V, i=1–10 (the order of transmitting subbands) and y designates a position in a vertical direction in a subband.

$Y_1(y), U_1(y), V_i(y)$ are separated from each other and written in positions <line y> of the corresponding subbands i in the memory for storing Y, U and V. This processing is done on all the lines in the subbands in the order from the lowest-resolution subband to the highest-resolution subband.

When an integrated component unit is composed of coefficients selected one from each subband, it is expressed as: $(Y_1(y, x), U_1(y, x), V_1(y, x))$ where $Y_1(y, x), U_1(y, x), V_1(y, x)$ are single-coefficient data of respective subbands Y, U and V, i=1–10 (the order of transmitting subbands) and y designates a position in a vertical direction in a subband and x designates a position in a horizontal direction in a subband.

Elements $Y_1(y, x), U_1(y, x), V_i(y, x)$ are separated from each other and written in positions (y, x) of a coefficient of the corresponding subbands i in the memory for storing Y, U and V. This processing is done on all the coefficients in the subbands from the lowest-resolution subband to the highest-resolution subband.

As described before referring to FIG. 12, the decoding side applies the same coefficient-scanning method as the coding side used even if an integrated component unit is selected by 1 line or by one coefficient.

The separate coefficients outputted from the component separating portion 204 are combined into respective component groups Y, U and V and then treated as respective groups.

Figure 16:
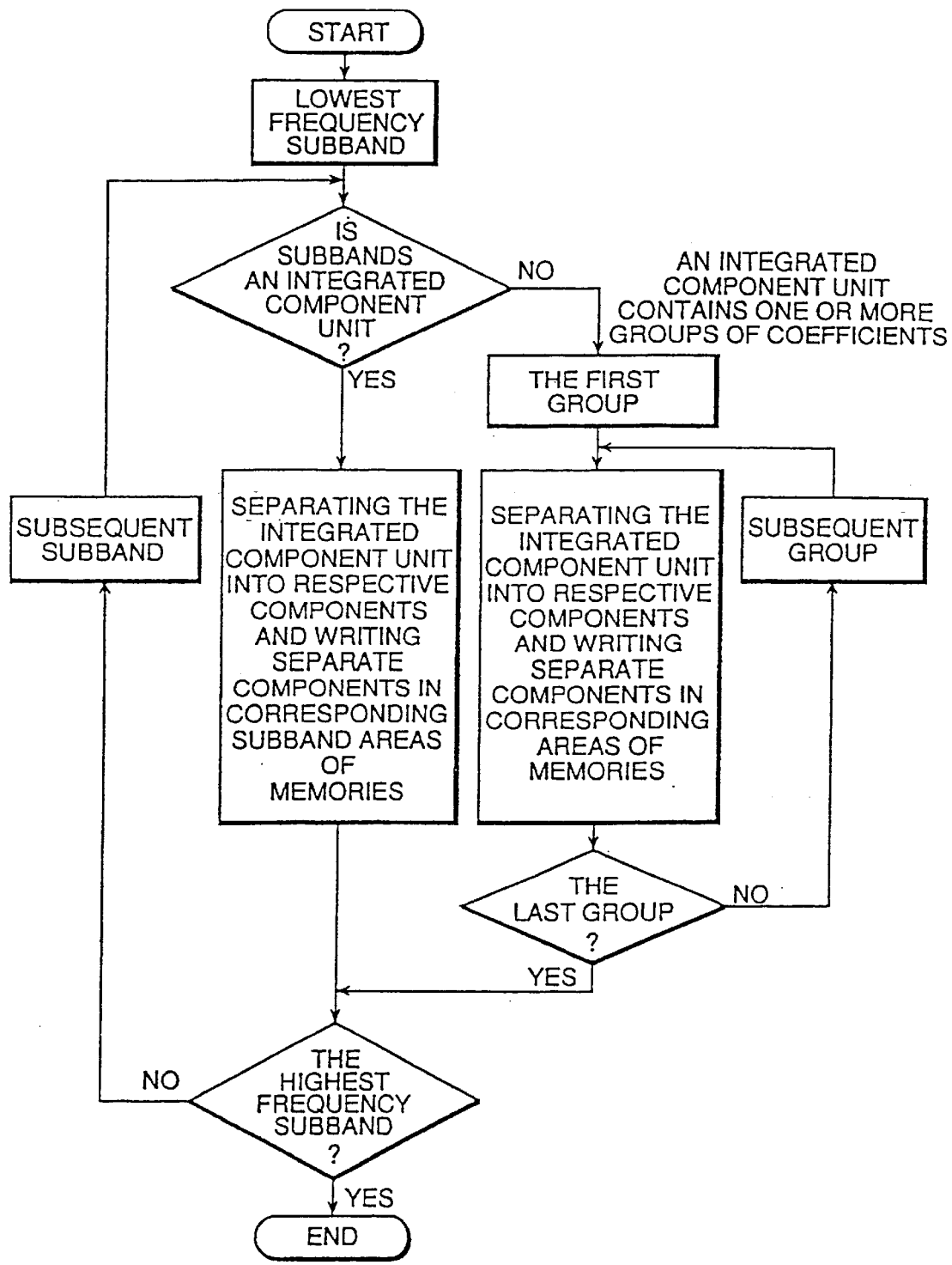
FIG. 16 is a flow chart depicting a procedure of operations of a video coding device which is the first embodiment of the present invention.

FIG. 16 is a flow chart depicting an exemplified operation procedure of the component separating portion 204. In the instance shown in FIG. 16, the integrated component unit may be changed over from the subbands to coefficients (one or more groups of coefficient) or vice versa. The portion 204 may be provided with either one of the two integrated component units.

Referring to FIG. 8, the operation of the data completing portion 205 will be described below in detail:

In this case, an integrated component unit is composed of one-line data in a subband.

Now let us suppose that the decoding operation was stopped by the action of the decoding truncating portion 203 because the number of bits of the decoded data exceeded a threshold value when data for instance one-line data of integrated component unit shown in FIG. 14, e.g., $(Y_1(0), U_1(0), V_1(0)), \ldots, (Y_3(5), U_3(5), V_3(5))$ has been decoded. In this instance, coefficients of the subbands 1 and 2 and coefficients of the first line to the fifth line of the subband 3 have been decoded but the remaining parts have no coefficient.

Data completing portion 205 produces subband coefficients by putting 0 in remaining vacant parts where no data exist. This enables the coefficient decoding portion 206 and the subband synthesizing portion 207 to normally perform subsequent processing steps. Vacant data may also be replaced with any other value than 0. The provision of the decoded data counting portion 202, the decoding truncating portion 203 and the data completing portion 205 enables the decoding side to truncate the decoding operation at any position by user's request.

The data completing portion 205 do nothing while the number of bits of the decoded data does not exceed the threshold value. Accordingly, a maximally expressible value may be previously set as the threshold value in case of decoding all the coded data. The embodiment may be a system of FIG. 8, which in this instance omits the decoded data counting portion 202, the decoding truncating portion 203, the data completing portion 205.

The coded data of the hierarchical structure, which represents an image composed of a plurality of components Y, U, V, can be decoded at the decoding side. The coded data of the hierarchical structure allows the progressive decoding the coded data, whereby the quality of the entire reproduced image is sequentially improved. As compared with the prior art method limited to the integrated component units of lines one for each component, the present invention enables the system to conduct a variety of progressive reproduction of the coded image. For example, the present invention method can uniformly improve the resolution of the reproduced image in horizontal, vertical and diagonal directions, whereas the prior art method improves the image resolution in the horizontal direction before the other directions.

A second embodiment of the present invention for coding and decoding an image composed of components having different sizes is described below. The second embodiment of the present invention is similar in construction to the first embodiment except for the operation of the transfer-order deciding and rearranging portion 104 (step of outputting an integrated component unit). Therefore, the same portions as the first embodiment are not explained further. Only the transfer-order deciding and rearranging portion 104 will be described below.

Figure 17:
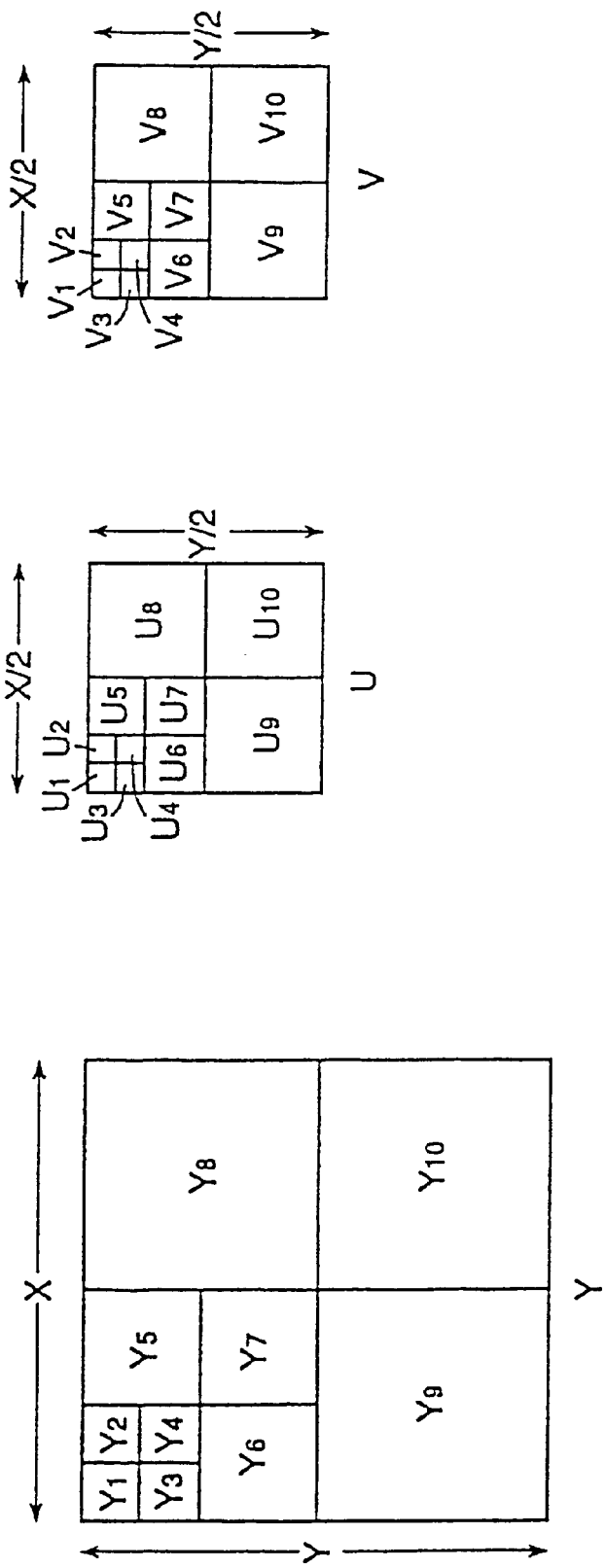
FIG. 17 depicts an example of decomposing image components into subbands in the second embodiment of the present invention.

For example, a format of 4:2:0 in which components U and V have a horizontal and vertical size being one-half that of the component Y is used. FIG. 17 shows resultants of three times of band-decomposition of each the component Y whose size is Y*X and the components U and V whose respective size is Y/2*X/2. In this case, the subbands U and V are each half the size of the component Y in horizontal and vertical directions. Respective components Y, U and V have the same number of subbands.

Accordingly, no problem arises with subband-based integrated units when applying the same scanning method and the same transmitting order as the first embodiment used. However, there may be a trouble with an integrated component unit composed of one or a plurality of coefficient.

The subbands Y, U, V are each different in size, so the large-sized component Y may have excess coefficients if an integrated component unit is composed of the same number of coefficients per subband as described before in the first embodiment of the present invention. Therefore, the number of coefficients per component to be included in an integrated component unit is set according to the size ratio of respective components if the components are different from each other in size.

Figure 18:
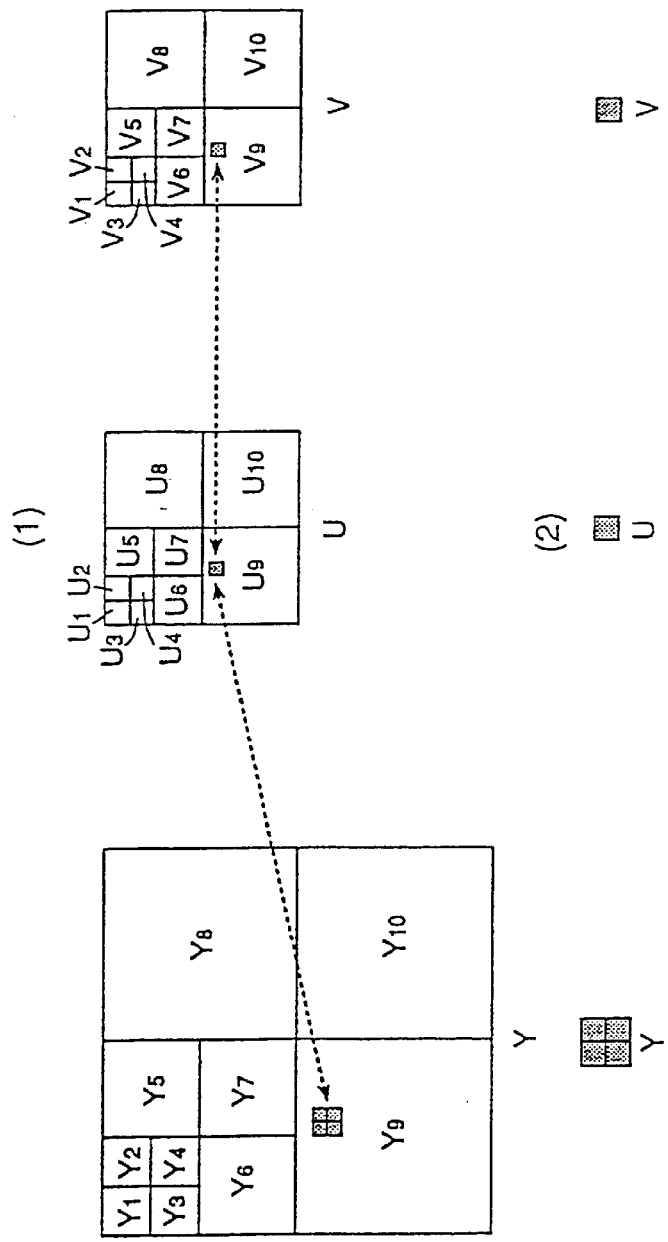
FIG. 18 depicts a relationship between coefficients of respective components in the second embodiment of the present invention.

A part (1) of FIG. 18 shows the corresponding of coefficients of respective components for an image in the format of 4:2:0 as shown in FIG. 17. As the components Y, U and V have the same number of subbands per component, the order of transferring the integrated component units is the same as shown in FIG. 10 for the first embodiment of the present invention. In this instance, the ratio of the horizontal and vertical lengths of the components Y, U and V is of 2:1:1, so one coefficient of each component U or V corresponds to 2 coefficients if the component Y. Accordingly, the numbers of coefficients for the components Y, U, V to be included in an integrated component unit is determined according to the ratio of 4:1:1.

The integrated component units prepared on the basis of the subbands of respective components contain coefficients of the components Y, U and V at the ratio of 4:1:1 and are processed in the same manner as described before for the first embodiment of the present invention.

Figure 20:
FIG. 20 depicts another example of an integrated component unit used in the second embodiment of the present invention.
Figure 19:
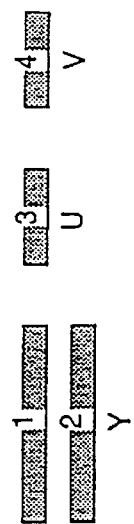
FIG. 19 depicts an example of an integrated component unit used in the second embodiment of the present invention.

Accordingly, an integrated component unit for one line per subband is prepared to contain two lines Y, one line U and one line V as shown in FIG. 19 while an integrated component unit for a coefficient group per subband is prepared to contain 2*2 coefficients Y, one coefficient U and one coefficient V and shown in FIG. 20. In FIG. 19, numerals suffixed to component data Y, U and V indicate, by way of example, the order of transferring the data within the respective integrated component units. The integrated component units for Y, U and V are processed one by one for one subband. On completion of processing one subband, the process advances to processing another subband in the order shown in the part (1) of FIG. 18. The order of transferring the subbands may be either one of those shown in FIG. 11 and the part (b) of FIG. 13.

With differently sized components Y, U and V, the video decoding side can decode the coded data transmitted from the coding side by changing the numbers of data of components contained in an integrated component unit according to the ratio of horizontal and vertical sizes of the components and writing the data in the corresponding positions in a memory.

The same scanning method and the same transferring order as described for the first embodiment can be applied in this embodiment when working with the subband-based integrated component units.

The second embodiment of the present invention is similar in construction and function to the first embodiment except for the operation of the transfer-order deciding and rearranging portion 204 (step of separating an integrated component unit into respective components and writing separated data in corresponding subbands in a memory). Therefore, the further description is omitted.

In the second embodiment of the present invention, it is possible to give coded data a hierarchical structure even if components of an image have different sizes. The decoding side can decode entire decoded data and can also obtain an entire reproduced image from a part of the coded data.

Although the second embodiment has been described with only an image having components whose horizontal and vertical size ratio is 2:1:1, it can treat other size ratios of image components in the similar manner as described above.

A third embodiment of the present invention is adaptable to the case of processing image components being different in size and decomposed into different numbers of decomposition levels by the subband decomposing portion 101 of FIG. 7. This embodiment of the present invention is similar to the first embodiment except for the operation of the transfer-order deciding and rearranging portion 104 (step of outputting an integrated component unit). Therefore, the same portions are not explained further. Only the transfer-order deciding and rearranging portion 104 will be described below.

Referring to FIG. 21, this embodiment is described by way of example with an input image whose components U and V have horizontal and vertical lengths being one half of those of the component Y. A part designated by (1) of FIG. 21 shows the results of decomposing the component Y three times and the components U and V twice respectively. As the number of subbands of Y differs from that of U and V, the third embodiment cannot use the transferring methods described for the first and second embodiments and so uses the following method of transferring the subbands.

An integrated component unit composed of subbands of respective components Y, U and V is first described. In this instance (first example), combinations of three-component subbands Y, U and V, prepared from sevens of low-resolution subbands of respective components Y, U and V as shown in a part (2) of FIG. 21, are transferred one by one to the variable-length coding portion 103 of FIG. 7, then three remaining subbands of the component Y are transferred independently one by one to the variable-length coding portion 103. In short, each one of low-resolution subbands of respective components Y, U and V, zero pieces of high-resolution subbands of the components U and V and only one of high-resolution subband of the component Y compose respective integrated component units to be output.

Accordingly, the transferring order is expressed as $(Y_1, U_1, V_1), (Y_2, U_2, V_2), \ldots, (Y_7, U_7, V_7), (Y_8), (Y_9), (Y_{10})$. In this instance, the subbands of respective Y, U, V component $(Y_1, U_i, V_1)$, where i=1 to 7 designates the transferring order, have the same sizes, so the same scanning method as used in the first embodiment can be applied to the case that integrated component unit is subbands or one or more groups of coefficient.

Subbands of components Y, U and V are combined by threes as shown in the part (b) of FIG. 13 to form combinations:
$(Y_1, U_1, V_1), (Y_2, Y_3, Y_4, U_2, U_3, U_4, V_2, V_3, V_4), (Y_5, Y_6, Y_7, U_5, U_6, U_7, V_5, V_6, V_7), (Y_8), (Y_9), (Y_{10})$.

Figure 22:
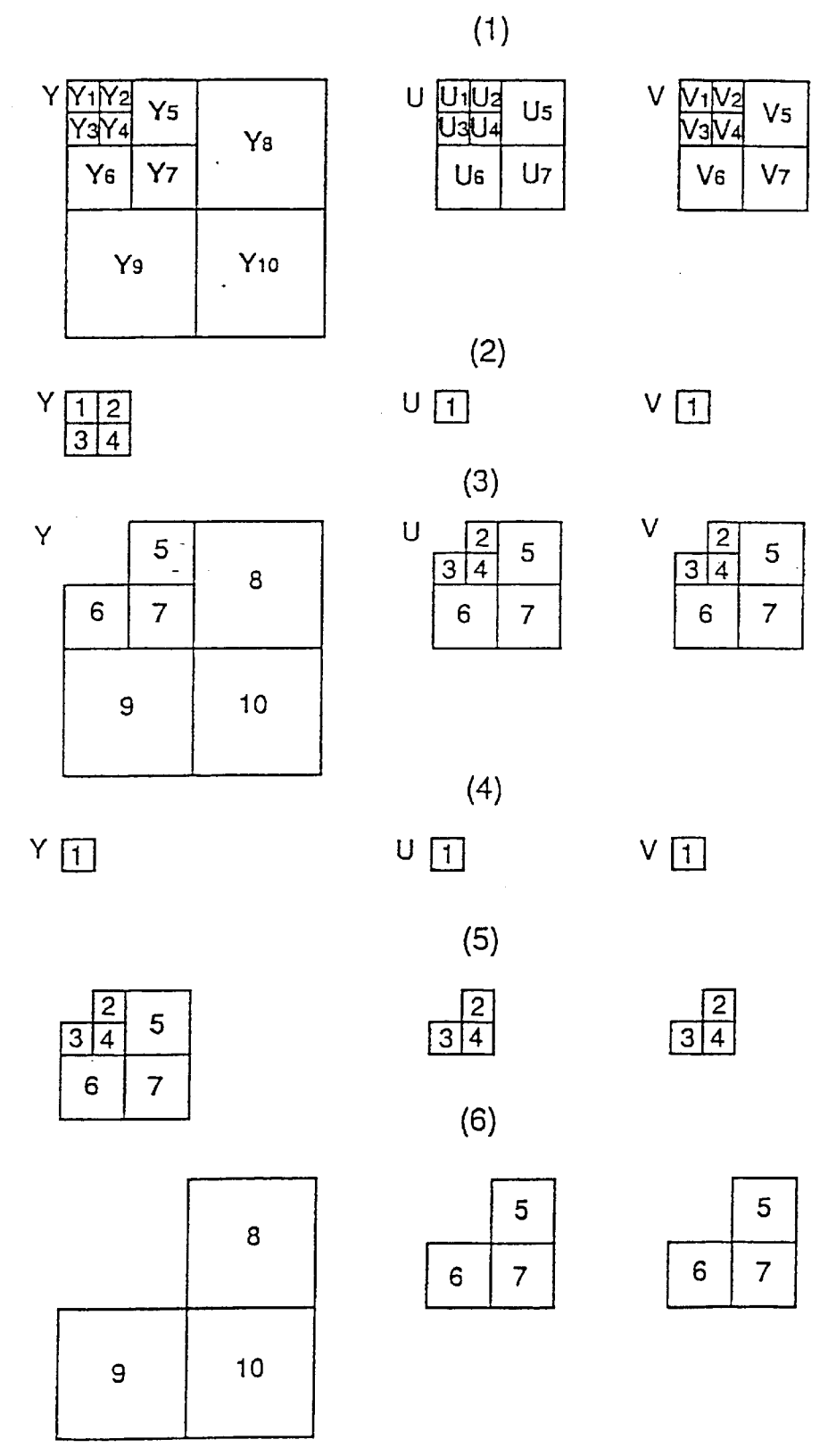

Another example (second example) is shown in FIG. 22. The subband images shown in a part (1) of FIG. 22 are obtained as the result of decomposing the component Y three times and the components U and V twice respectively. In this instance, integrated component units to be transmitted are formed by combining a set of four low-resolution subbands Y with two low-resolution subbands U and V as shown in a part (2) of FIG. 22 and by combining high-resolution subbands of the components Y, U and V with each other by ones as shown in a part (3) of FIG. 22.

The order of transferring the subbands is as follows: $(Y_1, Y_2, Y_3, Y_4, U_1, V_1), (Y_5, U_2, V_2), (Y_6, U_3, V_3), (Y_7, U_4, V_4), (Y_8, U_6, V_6), (Y_9, U_6, V_6), (Y_{10}, U_7, V_7)$.

In the second example, three components have corresponding subbands having different sizes, so the same scanning method as used in the second embodiment can be applied to each integrated component unit.

Subbands $(Y_5, Y_6, Y_7)$ shown in the part (3) of FIG. 22 corresponds to a vertical-resolution subband, a horizontal-resolution subband and a diagonal-resolution subband respectively and have the same resolution levels. Therefore, each integrated component unit can be prepared by combining respective high-resolution subbands of respective components Y, U and V by threes for each component. This is the third example of preparing an integrated component unit. Similarly, an integrated component unit may be prepared of combinations ($Y_8$, $Y_9$, $Y_{10}$), ($U_2$, $U_3$, $U_4$), ($U_5$, $U_6$, $U_7$), ($V_2$, $V_3$, $V_4$), ($V_5$, $V_6$, $V_7$).

In this instance, the transmitting order is as follows: ($Y_1$, $Y_2$, $Y_3$, $Y_4$, $U_1$, $V_1$), ($Y_5$, $Y_6$, $Y_7$, $U_2$, $U_3$, $U_4$, $V_2$, $V_3$, $V_4$), ($Y_8$, $Y_9$, $Y_{10}$, $U_5$, $U_6$, $U_7$, $V_5$, $V_6$, $V_7$).

In the above-described example, subbands $Y_1$, $Y_2$, $Y_3$, $Y_4$, $U_1$, $V_1$ are selected as a plurality of low-resolution subbands with keeping the size ratio of Y, U and V (in this example, the horizontal and vertical size ratio is 2:1:1). Besides the above combination, $Y_1$, $Y_2$, ..., $Y_7$, $U_1$, ..., $U_4$, $V_1$ ..., $V_4$ may also be selected as a plurality of the low-resolution subbands.

A further fourth example which is another variety of above-mentioned second or third example is such that the lowest resolution subbands Y, U, V is extracted from respective groups of low-resolution subbands $Y_1$, $Y_2$, ..., $Y_7$, $U_1$, ..., $U_4$, $V_1$ ..., $V_4$ for respective components and separately transferred as shown in a part (4) of FIG. 22 and a set of remaining low-resolution subbands is then transferred like second or third example. In this instance, the set of the low-resolution subbands is a combination of six Y-component subbands, three U-component subbands and three V-component subbands as shown in a part (5) of FIG. 22. After transmission of all the low-resolution subbands, high-resolution subbands shown in a part (6) of FIG. 22 are transferred.

In the case of combining subbands one for each component (corresponding to the second example), the order of transferring the subbands is as follows: ($Y_1$, $U_1$, $V_1$), ($Y_2$, $Y_3$, $Y_4$, $Y_5$, $U_2$, $V_2$), ($Y_6$, $U_3$, $V_3$), ($Y_7$, $U_4$, $V_4$), ($Y_8$, $U_5$, $V_5$), ($Y_9$, $U_6$, $V_6$), ($Y_{10}$, $U_7$, $V_7$).

In the case of combining subbands by threes for each component (corresponding to the third example), the order of transferring the subbands is as follows: ($Y_1$, $U_1$, $V_1$), ($Y_2$, $Y_3$, $Y_4$, $Y_5$, $Y_6$, $Y_7$, $U_2$, $U_3$, $U_4$, $V_2$, $V_3$, $V_4$), ($Y_8$, $Y_9$, $Y_{10}$, $U_5$, $U_6$, $U_7$, $V_5$, $V_6$, $V_7$).

For components having subband decomposition levels of not less than 4, subbands having resolution levels higher than that of a subband shown in a part (6) of FIG. 22 are the same in quantity for components Y, U and V. In this instance, integrated component units composed each of a combination of the same number of subbands Y, U, V are subsequently transmitted.

In the above examples from first to fourth, the transmitting order of the three subbands which have the same resolution levels in horizontal, vertical and diagonal directions shall not be restricted. In other words, for three subbands which have the same resolution levels as shown in a part (a) of FIG. 13, the transmitting order of these three subbands may be not only subband1, subband2, subband3, but also subband2, subband1, subband3, for example.

In the first example, the video decoding side can decode the coded data received from the coding side by separating components in each integrated component unit into groups of respective components Y, U and V, writing separated data in the corresponding subband areas in the memory and finally writing three highest-resolution subbands in the corresponding subband area of the memory.

In the second example, the video decoding side can decode the coded data received from the coding side by separating the subbands in each integrated component unit by reversing the process made by the coding side and writing the subbands of each component in the corresponding subband area in the corresponding memory. In this case, the third embodiment differs from the first and second embodiments by the fact that only the first integrated component unit is prepared from a plurality of the low-resolution subbands by the coding side and contains four subbands Y, one subband U and one subband V.

As described above, the number of low-resolution subbands to be combined with each other can be freely selected. For example, an initial integrated-component unit may contain seven Y-component subbands, four U-component subbands and four V-component subbands.

In the third example, each integrated component unit can be decomposed into subbands of respective components Y, U and V by the same method as described for the second example and written into corresponding subband areas (for Y, U and V components) in the memory for decoding them. Since the high-resolution subbands Y, U and V have been combined by threes in an integrated component unit at the coding side, the high-resolution subbands Y, U and V are recorded by threes for each component in corresponding subband areas in the memory for decoding them. This example differs from the second example by the above-mentioned feature.

In the fourth example, the video decoding side can decode the coded data received from the coding side by separating the subbands in each integrated component unit in the same manner as shown for decoding device in second or third example and writing the subbands of each component in the corresponding subband area in the corresponding memory. This example differs from the second and third examples by the fact that the lowest-resolution subbands of the respective components Y, U, V are first stored in the corresponding subband areas (Y, U, V) in the memory for decoding and then low-resolution subbands other than the lowest-resolution subbands are stored in the corresponding areas (Y, U, V) in the memory.

The video decoding device according to the third embodiment of the present invention is similar to that of the first embodiment except for the operation of the component separating portion 204 (step of separating each integrated component unit into respective components and writing the separated data in the corresponding areas in a memory). Therefore, further explanation is omitted.

With integrated component units each composed of one or more groups of coefficients such as lines instead of the subbands for respective components Y, U and V, the third embodiment can apply the same process as described before with the same case in the first and second embodiments based upon the same method as described for the integrated component unit composed the subbands for the respective components Y, U and V.

In the third embodiment of the present invention, an image whose components have different sizes and different decomposition levels can be encoded so that coded data having a hierarchical structure is obtained at the coding side and an entire image is reproduced from the entire coded data or a part of the coded data at the decoding side.

Although the third embodiment has been described by way of example with only an image having components whose size ratio is of 2:1:1, it can treat other size ratios of image components in the similar manner as described above. For example, an image whose components Y, U and V are the same in size and have different numbers of subbands can be encoded to have a hierarchical structure through the same process as described above in the third embodiment. The transmitting orders corresponding to those shown in FIGS. 11 and 13 are also adopted besides the described order of FIG. 10.

The three embodiments of the present invention have been described by way of example with the specified order of transferring the elements Y, U, V in the integrated component units but shall not be limited to that order.

INDUSTRIAL APPLICABILITY

The present invention brings following advantageous effects.

Firstly, the video coding device and the video decoding device according to the present invention operate with integrated component units whose elements are all frequency coefficients in m (m≧1) respective subbands of respective component $A^n$ and can therefore transmit and decoded first specified subbands of the image components that may be components Y, U and V and have different levels of influence on human visual property, allowing one to recognize an essence of the image at an earlier stage of decoding at the decoding side. When a codable image is known to be of higher resolution in a specified direction, the coding device can transmit first coded coefficients of higher-resolution-direction subbands and the decoding device can decode those coded coefficients, and even in case of terminating the decoding in the midway of decoding all coded data, can thereby reproduce the image from only data decoded till that time to improve subjective-image quality of the image.

Secondly, the video coding device and the video decoding device according to the present invention operate with integrated component units whose elements are m (m≧1) pieces of frequency coefficients having the same relative positions in m (m≧1) respective subbands of respective components $A^n$ and can decode those coded coefficients, terminate the decoding in the midway of decoding all the coded data and reproduce the image from only the data decoded until the time to improve subjective-image quality of the image when the image is composed of components R, G and B that have substantially almost the same influence on human visual property.

Thirdly, the video coding device and the video decoding device according to the present invention can be adapted to process an image whose luminance and chrominance components are different from each other by resolution, having a great advantage over the conventional method that can be applied to an image whose components have the same resolution. This feature provided by the present invention is very desirable in particular to digital image processing since many digital images are usually formatted to have higher resolution of the luminance component than that of chrominance component.

Fourthly, the video coding device and the video decoding device according to the present invention can be adapted to process an image whose luminance and chrominance components are different from each other by resolution and have different subband-decomposition levels, getting a great advantage over the conventional method that can be applied to an image whose components have the same resolution and the same number of subbands. This feature provided by the present invention is very desirable in particular to digital image processing since many digital images are usually formatted to have higher resolution of the luminance component than that of chrominance component and it is general to use the different subband-decomposition levels according to the components' resolution levels.

Fifthly, the video coding device and the video decoding device according to the present invention can be adapted to process an image whose luminance and chrominance components have different resolution levels and different subband-decomposition levels, getting a great advantage over the prior art method that can be applied to an image whose components have the same resolution and the same number of subbands. Furthermore, these aspects of the present invention provide such a feature that each integrated component unit always reflects the ratio of the number of respective components contained in an input image. This feature eliminates the need for decoding, redundant data at the decoding side when decoding the amount of data according to the resolution of the display unit.

Sixthly, in addition to the fifth advantageous effect above-mentioned, the video coding device and the video decoding device according to the present invention can first separate and transmit lowest-resolution subbands of respective components $A^n$ to first present the summary of an image, making it possible to improve subjective quality of the reproduced image.

What is claimed is:

1. An image decoding device comprising:

a variable-length decoder for decoding variable-length coded data of a hierarchically coded image, said hierarchically coded image including N (2≦ND) kinds of luminance or chrominance components $A^n$ (1≦n≦N, where n is an integer);

a decoding truncator for giving a decoding-stop command at any position designated by a user;

a data completing unit for producing subband coefficients by inserting a specified value where no data exists;

a component separating portion for separating integrated component units into respective components;

a coefficient decoder for decoding the data compensated for the lack of truncated data and the variable-length coded data compensated by the data completing unit; and a subband synthesizer for reconstructing a decoded image by synthesizing subbands containing data decoded by the coefficient decoder for respective components $A^n$, wherein an image decoded with truncated data is completely displayable by using data decoded before terminating decoding of said image.

2. The image decoding device as defined in claim 1, further comprising:

a data counter for counting bits of coded data decoded by the variable-length decoder, wherein the decoding truncator compares the number of bits counted by the data counter with an externally-given number of bits and gives a decoding-stop command when the number of decoded bits exceeds the externally-given number of bits.

3. An image decoding device comprising:

a variable-length decoder for decoding variable-length coded data of a hierarchically coded image, said hierarchically coded image including N (2≦N) kinds of luminance or chrominance components $A^n$(1≦n≦N, where n is an integer);

a decoding truncator for giving a decoding-stop command at any position designated by a user;

a data completing unit for compensating for a lack of truncated data by adding a specified value to each of the components $A^n$ composing a screenful image;

a coefficient decoder for decoding the data compensated for the lack of truncated data and the variable-length coded data compensated by the data completing unit;

a subband synthesizer for reconstructing a decoded image by synthesizing subbands containing data decoded by the coefficient decoder for respective components $A^n$, wherein an image decoded with truncated data is completely displayable by using data decoded before terminating decoding of said image; and a data counter for counting bits of coded data decoded by the variable-length decoder, wherein the decoding truncator compares the number of bits counted by the data counter with an externally-given number of bits and gives a decoding-stop command when the number of decoded bits exceeds the externally-given number of bits.

* * * * *